United States Patent
Jayakumar et al.

(10) Patent No.: US 11,006,044 B1
(45) Date of Patent: May 11, 2021

(54) POWER-EFFICIENT DYNAMIC ELECTRONIC IMAGE STABILIZATION

(71) Applicant: QUALCOMM Incorporated, San Diego, CA (US)

(72) Inventors: Hrishikesh Jayakumar, San Diego, CA (US); Edoardo Regini, San Diego, CA (US); Sungwon Lee, Huntington Beach, CA (US); Hyukjune Chung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/808,040

(22) Filed: Mar. 3, 2020

(51) Int. Cl.
*H04N 5/232* (2006.01)

(52) U.S. Cl.
CPC ..... *H04N 5/23267* (2013.01); *H04N 5/23258* (2013.01); *H04N 5/23293* (2013.01)

(58) Field of Classification Search
CPC ........... H04N 5/23267; H04N 5/23293; H04N 5/23258
USPC ......................................... 349/208.6, 208.99
See application file for complete search history.

(56) References Cited

U.S. PATENT DOCUMENTS

| | | | |
|---|---|---|---|
| 2006/0274156 A1* | 12/2006 | Rabbani | H04N 5/23293 |
| | | | 348/208.99 |
| 2007/0253732 A1* | 11/2007 | Usui | H04N 5/23258 |
| | | | 399/130 |
| 2013/0021504 A1* | 1/2013 | Plowman | G06T 5/003 |
| | | | 348/241 |
| 2013/0208143 A1* | 8/2013 | Chou | H04N 5/23293 |
| | | | 348/231.99 |
| 2017/0208250 A1* | 7/2017 | Uemura | H04N 5/772 |
| 2018/0131873 A1* | 5/2018 | Vacura | H04N 5/23267 |

* cited by examiner

*Primary Examiner* — Albert H Cutler
(74) *Attorney, Agent, or Firm* — QUALCOMM Incorporated

(57) ABSTRACT

Systems, methods, and non-transitory media are provided for power-efficient image stabilization. An example method can include collecting measurements from a motion sensor, the measurements being based on movement of an image sensor while capturing frames; calculating parameters for counteracting motions in a frame, wherein first parameters are based on the measurements and second parameters are based on some of the measurements; adjusting, in a first stabilization pass of a dual-pass stabilization process, the first frame according to the second parameters; adjusting, in a second stabilization pass of the dual-pass stabilization process, the first frame according to the first parameters; based on a second frame having less motion than the first frame, enabling for the second frame a single-pass stabilization process for both a frame preview process and video record process; and adjusting, in the single stabilization pass, the second frame according to parameters for counteracting motions in the second frame.

30 Claims, 12 Drawing Sheets

| T31 | F31 | L | F31 | F31 | F31 | - | F31 | F27 | S1 | |
|---|---|---|---|---|---|---|---|---|---|---|
| T30 | F30 | L | F30 | F30 | F30 | - | F30 | F26 | S1 | |
| T29 | F29 | L | F29 | F29 | F29 | - | F29 | F25 | S1 | |
| T28 | F28 | L | F28 | F28 | F28 | - | F28 | F24 | S1 | ← EIS1 |
| T27 | F27 | L | F27 | F27 | F27 | F23 | F23, F27 | F23 | S3 | |
| T26 | F26 | L | F26 | F26 | F26 | F22 | F22, F26 | F22 | S3 | |
| T25 | F25 | L | T25 | F25 | F25 | F21 | F21, F25 | F21 | S3 | |
| T24 | F24 | L | F24 | F24 | F24 | F20 | F20, F24 | F20 | S3 | EIS2 → |
| T23 | F23 | L | F23 | F23 | - | F19 | F19 | F19 | S2 | |
| T22 | F22 | L | F22 | F22 | - | F18 | F18 | F18 | S2 | |
| T21 | F21 | L | F21 | F21 | - | F17 | F17 | F17 | S2 | |
| T20 | F20 | L | F20 | F20 | - | F16 | F16 | F16 | S2 | |

A

FIG. 6 (Countinued)

POWER-EFFICIENT DYNAMIC ELECTRONIC IMAGE STABILIZATION

TECHNICAL FIELD

The present disclosure generally relates to electronic image stabilization, and more specifically to power-efficient dynamic electronic image stabilization.

BACKGROUND

The increasing versatility of digital camera products has allowed video recording capabilities to be integrated into a wide array of devices and has expanded their use to new applications. For example, phones, drones, cars, computers, televisions, and many other devices today are often equipped with cameras. The cameras allow users to capture video and images from any device equipped with a camera. The video and images can be captured for recreational use, professional photography, surveillance, and automation, among other applications. The quality of the video and images largely depends on the specific hardware capabilities of the camera. However, various software-based technologies have also been developed and implemented to enhance the quality of video and images captured from cameras. For example, electronic image stabilization (EIS) or digital image stabilization is a digital technique developed to minimize blurring and other image quality issues caused by movement or shaking of the camera during use.

EIS tries to detect any motion of the camera and adjust the captured image data to counter the detected motion of the camera, thereby generating a smoother video. Unfortunately, current EIS solutions are inefficient and involve unnecessarily high power consumption. For example, EIS solutions generally perform various redundant operations and consume high amounts of power in order to satisfy latency and quality requirements for both video previewing and video encoding/recording. Such high power consumption and processing inefficiencies can have a negative impact on video recording devices, and particularly those devices that have a more-limited amount of compute and energy resources such as mobile devices. Consequently, flexible and power-efficient techniques are needed to enable electronic image stabilization at lower power consumption rates while satisfying latency and quality needs.

BRIEF SUMMARY

Disclosed are systems, methods, and computer-readable media for providing power-efficient, dynamic electronic image stabilization (EIS). According to at least one example, a method is provided for power-efficient, dynamic EIS. The method can include obtaining one or more motion measurements associated with an image sensor, the one or more motion measurements being based on movement of the image sensor while the image sensor is capturing a sequence of frames; calculating a first set of parameters and a second set of parameters for counteracting motion in a first frame from the sequence of frames, wherein the first set of parameters is based on the one or more motion measurements corresponding to the movement of the image sensor while the image sensor is capturing the sequence of frames, and wherein the second set of parameters is based on a first portion of the one or more motion measurements corresponding to movement of the image sensor while capturing the first frame; in response to determining that a difference between the first set of parameters and the second set of parameters is above a threshold, switching from a dual-pass stabilization process enabled for the first frame to a single-pass stabilization process for the second frame, the single-pass stabilization process comprising a single motion stabilization pass used for both a frame preview process and a video record process; and adjusting, as part of the single motion stabilization pass, the second frame according to a third set of parameters for counteracting motions in the second frame, the third set of parameters being based on a second portion of the one or more motion measurements corresponding to movement of the image sensor while capturing the second frame.

According to at least one example, an apparatus is provided for power-efficient, dynamic EIS. The apparatus can include memory; and one or more processors coupled to the memory, the one or more processors being configured to obtain one or more motion measurements associated with an image sensor, the one or more motion measurements being based on movement of the image sensor while the image sensor is capturing a sequence of frames; calculate a first set of parameters and a second set of parameters for counteracting motion in a first frame from the sequence of frames, wherein the first set of parameters is based on the one or more motion measurements corresponding to the movement of the image sensor while the image sensor is capturing the sequence of frames, and wherein the second set of parameters is based on a first portion of the one or more motion measurements corresponding to movement of the image sensor while capturing the first frame; in response to determining that a difference between the first set of parameters and the second set of parameters is above a threshold, switch from a dual-pass stabilization process enabled for the first frame to a single-pass stabilization process for the second frame, the single-pass stabilization process comprising a single motion stabilization pass used for both a frame preview process and a video record process; and adjust, as part of the single motion stabilization pass, the second frame according to a third set of parameters for counteracting motions in the second frame, the third set of parameters being based on a second portion of the one or more motion measurements corresponding to movement of the image sensor while capturing the second frame.

According to at least one example, another apparatus is provided for power-efficient, dynamic EIS. The apparatus can include means for obtaining one or more motion measurements associated with an image sensor, the one or more motion measurements being based on movement of the image sensor while the image sensor is capturing a sequence of frames; calculating a first set of parameters and a second set of parameters for counteracting motion in a first frame from the sequence of frames, wherein the first set of parameters is based on the one or more motion measurements corresponding to the movement of the image sensor while the image sensor is capturing the sequence of frames, and wherein the second set of parameters is based on a first portion of the one or more motion measurements corresponding to movement of the image sensor while capturing the first frame; in response to determining that a difference between the first set of parameters and the second set of parameters is above a threshold, switching from a dual-pass stabilization process enabled for the first frame to a single-pass stabilization process for the second frame, the single-pass stabilization process comprising a single motion stabilization pass used for both a frame preview process and a video record process; and adjusting, as part of the single motion stabilization pass, the second frame according to a third set of parameters for counteracting motions in the second frame, the third set of parameters being based on a second portion of the one or more motion measurements corresponding to movement of the image sensor while capturing the second frame.

According to at least one example, a non-transitory computer-readable storage medium is provided for power-efficient, dynamic EIS. The non-transitory computer-readable storage medium can include instructions stored thereon which, when executed by one or more processors, cause the one or more processors to obtain one or more motion measurements associated with an image sensor, the one or more motion measurements being based on movement of the image sensor while the image sensor is capturing a sequence of frames; calculate a first set of parameters and a second set of parameters for counteracting motion in a first frame from the sequence of frames, wherein the first set of parameters is based on the one or more motion measurements corresponding to the movement of the image sensor while the image sensor is capturing the sequence of frames, and wherein the second set of parameters is based on a first portion of the one or more motion measurements corresponding to movement of the image sensor while capturing the first frame; in response to determining that a difference between the first set of parameters and the second set of parameters is above a threshold, switch from a dual-pass stabilization process enabled for the first frame to a single-pass stabilization process for the second frame, the single-pass stabilization process comprising a single motion stabilization pass used for both a frame preview process and a video record process; and adjust, as part of the single motion stabilization pass, the second frame according to a third set of parameters for counteracting motions in the second frame, the third set of parameters being based on a second portion of the one or more motion measurements corresponding to movement of the image sensor while capturing the second frame.

In some aspects, the method, apparatuses, and non-transitory computer-readable storage medium described above can include triggering, prior to switching to the single-pass stabilization process for the second frame, a motion stabilization transition process for transitioning from the dual-pass stabilization process to the single-pass stabilization process, wherein the motion stabilization transition process comprises two motion stabilization passes, a first motion stabilization pass of the motion stabilization transition process corresponding to the frame preview process and a second motion stabilization pass of the motion stabilization transition process corresponding to the video record process.

In some examples, at least one of switching to the single-pass stabilization process for the second frame and/or triggering the motion stabilization transition process can be based on a determination that a low motion confidence condition is satisfied, the low motion confidence condition defining at least one of a low motion threshold for triggering the switch from the dual-pass stabilization process to the single-pass stabilization process, a number of frames set to meet the low motion threshold before triggering the switch from the dual-pass stabilization process to the single-pass stabilization process, and/or a period of time set to meet the low motion threshold before triggering the switch from the dual-pass stabilization process to the single-pass stabilization process.

In some aspects, the method, apparatuses, and non-transitory computer-readable storage medium described above can include adjusting, as part of the first motion stabilization pass of the motion stabilization transition process, intermediary frames in the sequence of frames according to a fourth set of parameters for counteracting motion in the intermediary frames, the fourth set of parameters being based on one or more additional motion measurements corresponding to movement of the image sensor while capturing the intermediary frames, the intermediary frames being captured by the image sensor after the first frame and before the second frame; and adjusting, as part of the second motion stabilization pass of the motion stabilization transition process, the intermediary frames according to a set of transition parameters for countering motion in the intermediary frames, the set of transition parameters being based on at least one of the one or more additional motion measurements associated with the intermediary frames, a set of motion measurements corresponding to movement of the image sensor while capturing a set of additional frames from the sequence of frames, the first set of parameters associated with the first frame, the second set of parameters associated with the second frame, and the fourth set of parameters associated with the intermediary frames.

In some examples, the set of additional frames from the sequence of frames can include one or more future frames captured by the image sensor after at least one of the intermediary frames and before the second frame. In some aspects, the method, apparatuses, and non-transitory computer-readable storage medium described above can include calculating the set of transition parameters. In some cases, calculating the set of transition parameters can include calculating motion stabilization parameters for countering motion in the intermediary frames, the motion stabilization parameters being based on at least one of the one or more additional motion measurements associated with the intermediary frames and the set of motion measurements associated with the set of additional frames; and adjusting the motion stabilization parameters based on at least one of a first difference between the motion stabilization parameters and one or more motion stabilization parameters calculated via the single-pass stabilization process and a second difference between the motion stabilization parameters and one or more additional motion stabilization parameters calculated via the dual-pass stabilization process.

In some examples, the one or more motion stabilization parameters can be calculated based on respective motion measurements representing movement of the image sensor while capturing a first respective frame associated with the one or more motion stabilization parameters, wherein the one or more additional motion stabilization parameters are calculated based on future motion measurements representing movement of the image sensor while capturing one or more future frames, the one or more future frames comprising frames captured after a second respective frame associated with the one or more additional motion stabilization parameters.

In some examples, adjusting the motion stabilization parameters can include reducing at least one of the first difference between the motion stabilization parameters and the one or more motion stabilization parameters calculated via the single-pass stabilization process and reducing the second difference between the motion stabilization parameters and the one or more additional motion stabilization parameters calculated via the dual-pass stabilization process.

In some aspects, the method, apparatuses, and non-transitory computer-readable storage medium described above can include, prior to switching to the single-pass stabilization process for the second frame, triggering a motion stabilization transition process, the motion stabilization transition process aligning a first motion stabilization trajectory of intermediary frames with at least one of a second motion stabilization trajectory associated with the single-pass stabilization process and a third motion stabilization trajectory associated with the dual-pass stabilization process, wherein the intermediary frames are captured by the image device after the first frame and before the second frame.

In some examples, the movement of the image sensor can include at least one of a pitch, a roll, and/or a yaw of the image sensor.

In some aspects, the method, apparatuses, and non-transitory computer-readable storage medium described above can include detecting that a subsequent frame from the sequence of frames has a higher amount of motion than at least one of the second frame and one or more intermediary frames captured by the image sensor after the second frame and before the subsequent frame; in response to detecting the higher amount of motion, switching from the single-pass stabilization process to the dual-pass stabilization process; adjusting, as part of a first motion stabilization pass associated with the dual-pass stabilization process, the subsequent frame based on respective parameters for countering motions in the subsequent frame, the respective parameters being based on one or more respective motion measurements corresponding to movement of the image sensor while capturing the subsequent frame; and adjusting, as part of a second motion stabilization pass associated with the dual-pass stabilization process, the subsequent frame based on a fourth set of parameters for countering motion in the subsequent frame, the fourth set of parameters being based on one or more additional motion measurements corresponding to movement of the image sensor while capturing the subsequent frame and one or more subsequent frames, the one or more subsequent frames being captured after the subsequent frame.

In some aspects, the method, apparatuses, and non-transitory computer-readable storage medium described above can include adjusting, as part of a first motion stabilization pass associated with the dual-pass stabilization process enabled for the first frame, the first frame according to the second set of parameters, wherein the first motion stabilization pass corresponds to the frame preview process; and adjusting, as part of a second motion stabilization pass associated with the dual-pass stabilization process, the first frame according to the first set of parameters, wherein the second motion stabilization pass corresponds to the video record process.

In some examples, adjusting the first frame according to the first set of parameters can include stabilizing the first frame to reduce at least some of the motion in the first frame, wherein adjusting the first frame according to the second set of parameters can include stabilizing the first frame to reduce at least some of the motion in the first frame, and wherein adjusting the second frame according to third set of parameters can include stabilizing the second frame to reduce at least some of the motion in the second frame.

In some aspects, the second set of parameters used for the first motion stabilization pass can be calculated at least partly based on one or more future motion measurements corresponding to one or more future frames from the sequence of frames, wherein the first set of parameters used for the second motion stabilization pass is calculated without using future motion measurements corresponding to future frames from the sequence of frames, and wherein the difference between the first set of parameters and the second set of parameters is above the threshold when an amount of motion between the first frame and the second frame is above a threshold amount of motion.

In some aspects, the apparatuses described above can include one or more sensors and/or a mobile device. In some examples, the apparatuses described above can include a mobile phone, a wearable device, a display device, a mobile computer, a head-mounted device, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
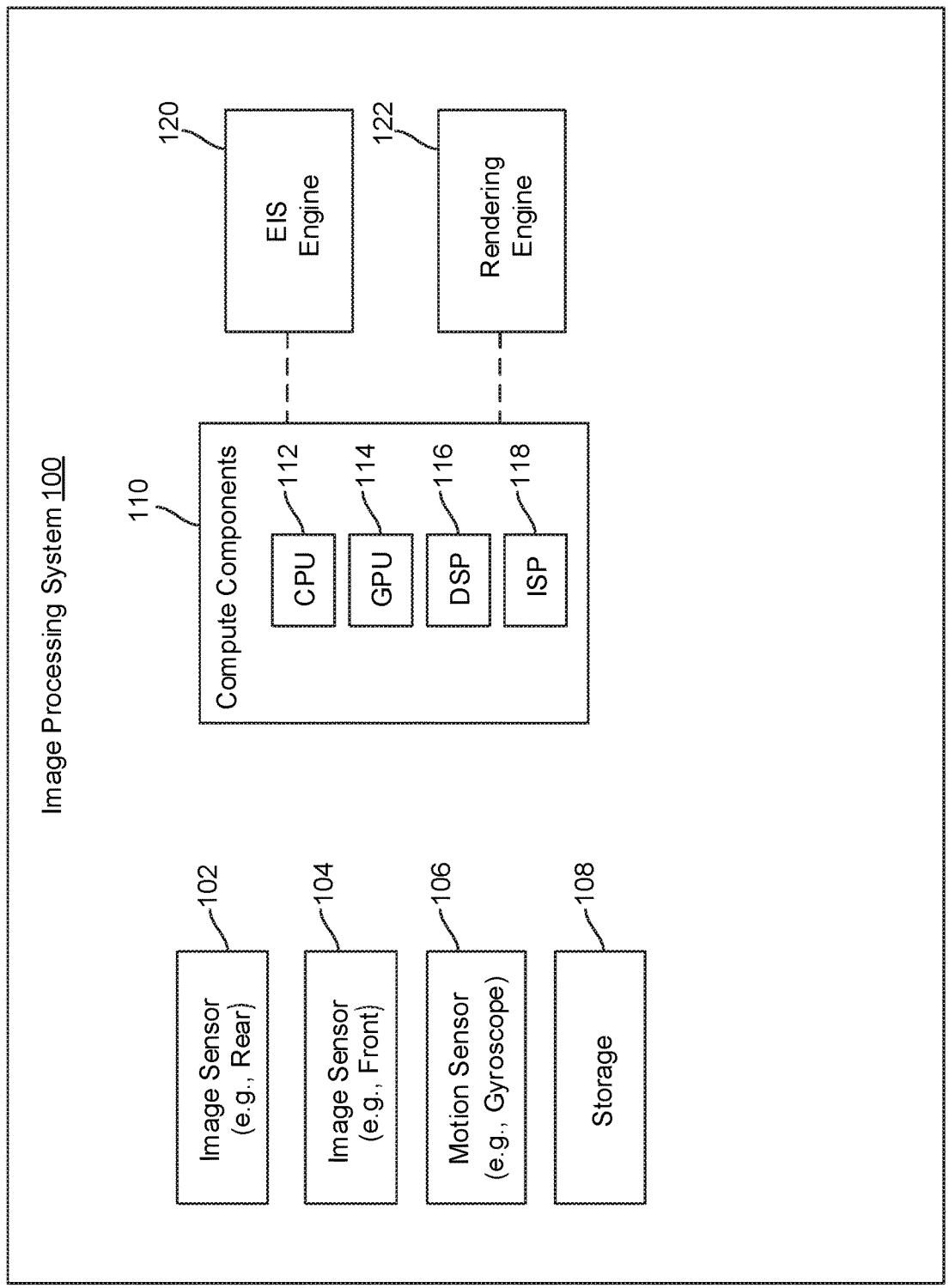
FIG. 1 is a block diagram illustrating an example of an image processing system for implementing electronic image stabilization, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, video recording capabilities have become ubiquitous with the unprecedented growth of cameras and electronic devices equipped with cameras such as mobile phones, drones, portable computers and Internet-of-Things (IoT) devices, virtual reality (VR) devices, augmented reality (AR) devices, among others. Typically, users can record video and images from their devices while also being able to preview the video or images on a display as they are recorded. However, videos recorded or encoded on mobile devices are prone to quality issues such as blurring caused by movement or shaking of the mobile devices. Such movement or shaking can often be induced by hand jitter, local motion of the person or object recording the scene, or other extraneous motions such as motion from a vehicle or other moving platforms. In some cases, electronic image stabilization (EIS) techniques can be implemented to correct or counter such motion or shaking of recording devices and provide a smoother and sharper video/image output without (or with reduced) blurring.

EIS uses motion data collected from one or more sensors on the device, such as a gyroscope or an accelerometer, to estimate the amount of motion or shaking that should be corrected or countered. EIS can adjust the captured frames to compensate for the amount of motion or shaking estimated. Such compensation can be applied to frames as they are previewed on a display and when the frames are encoded for later playback. Generally, EIS latency requirements for preview frames are lower than for video encoding, as preview frames are presented to the user while new frames are recorded and a higher latency can cause perceivable delays in the preview frames (in other words, latency has a greater impact on the user experience). To satisfy the lower latency requirements for preview frames while achieving higher quality EIS results for encoded frames, each frame can be processed twice to apply EIS separately for preview and encoding. For example, the preview processing path can apply EIS without motion information from future frames (e.g., subsequently captured frames) to minimize the processing latency for preview frames, and the video record path can apply EIS with motion information from future frames to achieve a higher quality stabilization result.

While applying EIS separately for the preview path and the video recording path can reduce the preview latency while increasing the stabilization quality for recorded frames, the processing of each frame twice is also inefficient and can result in higher power consumption. Accordingly, to increase efficiency and reduce power consumption resulting from multiple EIS operations (e.g., dual-pass EIS) for the same frame, in some examples, the approaches herein can dynamically switch between single-pass EIS (e.g., performing EIS once for both preview and encoding/recording) and dual-pass EIS (e.g., performing a first EIS for preview and a second EIS for encoding/recording) at different times. In some cases, during periods when little to no motion or shaking is detected, the approaches herein can perform single-pass EIS. During this period, EIS can be performed once for both preview and encoding/recording. On the other hand, during periods when motion or higher motion is detected, the approaches herein can switch to dual-pass EIS, where EIS is performed twice: once for preview and once for encoding/recording.

Figure 8:
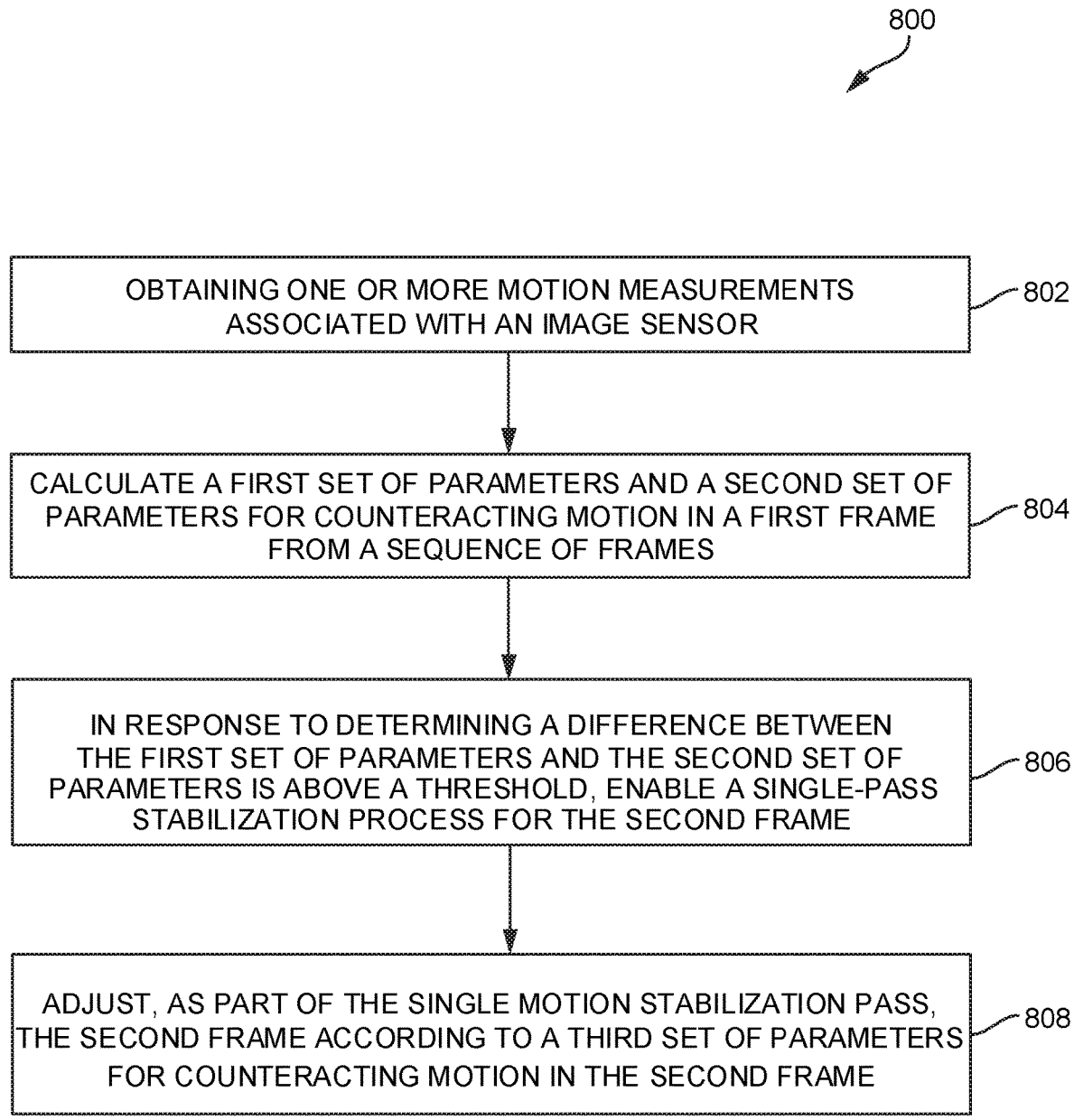
FIG. 8 illustrates an example method for power-efficient and dynamic electronic image stabilization, in accordance with some examples of the present disclosure.
Figure 9:
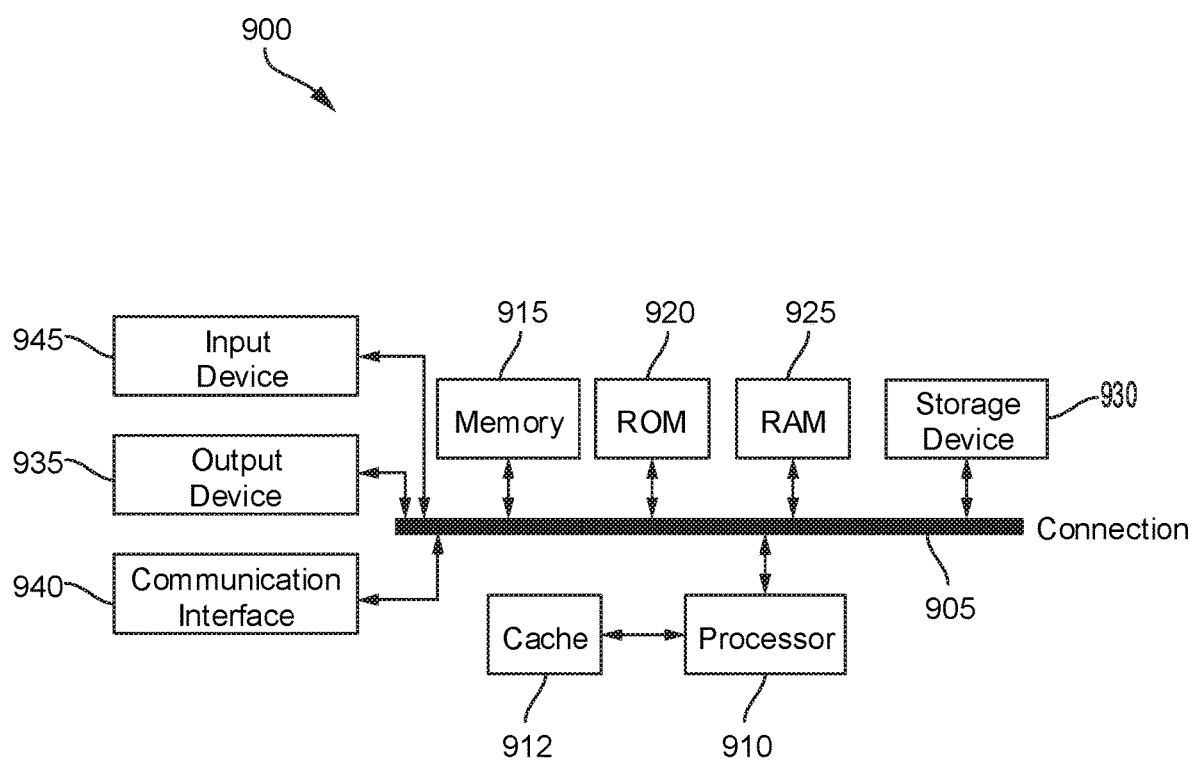
FIG. 9 illustrates an example computing device architecture, in accordance with some examples of the present disclosure.

The present technology will be described in greater detail in the following disclosure. The discussion begins with a description of example systems, architectures, and techniques for providing power-efficient and dynamic EIS, as illustrated in FIGS. 1 through 7B. A description of an example method for implementing power-efficient and dynamic EIS, as illustrated in FIG. 8, will then follow. The discussion concludes with a description of an example computing device architecture including example hardware components suitable for performing power-efficient and dynamic EIS, as illustrated in FIG. 9. The disclosure now turns to FIG. 1.

FIG. 1 is a diagram illustrating an example image processing system 100 for performing power-efficient, dynamic EIS. In this illustrative example, the image processing system 100 includes image sensors 102 and 104, motion sensor 106, storage 108, compute components 110, an EIS engine 120, and a rendering engine 122.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a television, a display device, a digital media player, a gaming console, a video streaming device, a drone, a computer in a car, an IoT (Internet-of-Things) device, a smart wearable device, an AR and/or VR device (e.g., a head-mounted display (HMD), AR glasses, or other AR and/or VR device), or any other suitable electronic device(s). In some implementations, the image sensors 102 and 104, the motion sensor 106, the storage 108, the compute components 110, the EIS engine 120, and the rendering engine 122 can be part of the same computing device. For example, in some cases, the image sensors 102 and 104, the motion sensor 106, the storage 108, the compute components 110, the EIS engine 120, and the rendering engine 122 can be integrated into a smartphone, laptop, tablet computer, smart wearable device, gaming system, and/or any other computing device. However, in some implementations, the image sensors 102 and 104, the motion sensor 106, the storage 108, the compute components 110, the EIS engine 120, and the rendering engine 122 can be part of two or more separate computing devices.

The image sensors 102 and 104 can be any image and/or video sensors or capturing devices, such as a digital camera sensor, a video camera sensor, a smartphone camera sensor, an image/video capture device on an electronic apparatus such as a television or computer, a camera, etc. In some cases, the image sensors 102 and 104 can be part of a camera or computing device such as a digital camera, a video camera, an IP camera, a smartphone, a smart television, a game system, etc. In some examples, the image sensor 102 can be a rear image sensor device (e.g., a camera, video, and/or image sensor on a back or rear of a device) and the image sensor 104 can be a front image sensor device (e.g., a camera, image, and/or video sensor on a front of a device). In some examples, the image sensors 102 and 104 can be part of a dual-camera assembly. The image sensors 102 and 104 can capture image and/or video content (e.g., raw image and/or video data), which can then be processed by the compute components 110, the EIS engine 120, and the rendering engine 122 as described herein. While the image processing system 100 in FIG. 1 illustrates two image sensors (102 and 104), it should be noted that the two image sensors are provided for illustration purposes and other examples may include more or less image sensors. For example, in some examples, the image processing system 100 can include a single image sensor and, in other examples, the image processing system 100 can include more than two image sensors.

The motion sensor 106 can be any sensor for detecting and measuring movement. Non-limiting examples of motion sensors include gyroscopes, accelerometers, and magnetometers. In one illustrative example, the motion sensor 106 can be a gyroscope configured to sense or measure the extent and rate of rotation (e.g., roll, pitch, and yaw) of the image sensors 102 and 104 and/or the image processing system 100, and provide the sensed or measured data to the compute components 110 for processing as described herein. In some cases, the motion sensor 106 can represent a different type of motion sensor or a combination of motion sensors. For example, the motion sensor can include a gyroscope and an accelerometer, a gyroscope and a magnetometer, an accelerometer and a magnetometer, or a gyroscope, an accelerometer, and a magnetometer. Moreover, the image processing system 100 can also include other sensors, such as a machine vision sensor, a smart scene sensor, a speech recognition sensor, an impact sensor, a shock sensor, a position sensor, a tilt sensor, an inertial measurement unit (IMU), etc.

The storage 108 can be any storage device(s) for storing data. Moreover, the storage 108 can store data from any of the components of the image processing system 100. For example, the storage 108 can store data from the image sensors 102 and 104 (e.g., image or video data), data from motion sensor 106 (e.g., gyroscope data, accelerometer data, etc.), data from the compute components 110 (e.g., processing parameters, stabilized frames, encoded frames, etc.), data from the EIS engine 120 (e.g., EIS parameters, EIS outputs, etc.) and/or data from the rendering engine 122 (e.g., output frames). In some examples, the storage 108 can include a buffer for storing frames for processing by the compute components 110. In some cases, the storage 108 can include a display buffer for storing frames previewing and a video buffer for storing frames for encoding/recording, as further described herein.

The compute components 110 can include a central processing unit (CPU) 112, a graphics processing unit (GPU) 114, a digital signal processor (DSP) 116, and/or an image signal processor (ISP) 118. In some examples, the compute components 110 can include a machine learning and/or artificial intelligence processor in addition to, or instead of, any of the CPU 112, the GPU 114, the DSP 116, and/or the ISP 118. While the image processing system 100 in FIG. 1 is illustrated with four compute components (CPU 112, GPU 114, DSP 116, ISP 118), it should be noted that the type and number of compute components shown in FIG. 1 are provided for illustration purposes, and other examples may include more or less compute components. For example, in some cases, the image processing system 100 may include one or more processors, such as one or more CPUs, GPUs, DSPs, and/or ISPs.

The compute components 110 can perform various operations such as image enhancement, computer vision, graphics rendering, augmented reality, image/video processing, sensor processing, recognition (e.g., text recognition, object recognition, feature recognition, tracking or pattern recognition, scene change recognition, etc.), EIS, machine learning, filtering, and any of the various operations described herein. In the example shown in FIG. 1, the compute components 110 implement an EIS engine 120 and a rendering engine 122. In other examples, the compute components 110 can also implement one or more image processing engines and/or any other processing engines. The operations for the EIS engine 120 and the rendering engine 122 (and any image processing engines) can be implemented by any of the compute components 110. In one illustrative example, the operations of the rendering engine 122 can be implemented by the GPU 114, and the operations of the EIS engine 120 and/or one or more image processing engines can be implemented by the CPU 112, the DSP 116, and/or the ISP 118. In some cases, the compute components 110 can include other electronic circuits or hardware, computer software, firmware, or any combination thereof, to perform any of the various operations described herein.

In some cases, the ISP 118 can receive data (e.g., image data, video data, etc.) captured by the image sensors 102 or 104 and process the data to generate output frames intended for output to a display. For example, the ISP 118 can receive frames captured by image sensor 102, stabilize the frames, and generate stabilized frames for display. A frame can include a video frame of a video sequence or a still image. A frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color in any color space. In some examples, a frame can be a monochrome frame or picture.

The ISP 118 can implement one or more image processing engines and can perform image processing operations, such as filtering, demosaicing, scaling, color correction, color conversion, noise reduction filtering, spatial filtering, EIS, etc. The ISP 118 can process frames captured by the image sensors 102 and 104; frames in storage 108; frames received from a remote source, such as a remote camera, a server or a content provider; frames obtained from a combination of sources; etc. For example, the ISP 118 can perform EIS to stabilize frames captured by the image sensors 102 and 104. The ISP 118 can stabilize the frames to counter any motions in the frames caused by movement (e.g., shaking, vibrations, etc.) of the image sensors that captured the frames (e.g., image sensors 102 or 104) in order to remove any blur or quality issues created by the motions in the frames. The motions in the frames can result from movements of an image sensor device, such as a camera sensor, that captured the frames (e.g., image sensors 102 or 104), created while capturing the frames. The movements can be caused, for example, by an operator of the image sensor device; a vehicle carrying or utilizing the image sensor device; a nearby device (e.g., vibrations generated by a nearby smartphone or speaker); any external forces causing movements of the image sensor device (e.g., wind, water, animals, projectiles, human events such as vandalism, natural events such as earthquakes, etc.); vibrations generated by components in a system where the image sensor device is housed (e.g., the image processing system 100); internal vibrations generated by components in the image sensor device; etc.

For example, if a person carrying image sensor 102 records video while performing a physical activity such as walking or running, the image sensor 102 may capture motions caused by movement of the image sensor 102 as a result of the physical activity and/or unsteady image sensor or device handling by the person. The motions captured by the image sensor 102 can cause blur and jitter in the recorded video. The ISP 118 can receive the video from the image sensor 102 and perform image stabilization to counter or remove the motions in the video and thus improve the clarity and smoothness of the video.

The ISP 118 can implement (e.g., via EIS engine 120) one or more algorithms and schemes for EIS. For example, the ISP 118 can implement single-pass EIS at certain periods of time and dual-pass EIS at other periods of time. The ISP 118 can switch between single-pass EIS and dual-pass EIS based on an amount of motion detected on current frames and a configured period of time without threshold variations in the amount of motion detected in current frames. Single-pass EIS can include performing a single EIS process for both preview frames and recorded/encoded frames. Dual-pass EIS can include performing separate EIS processes for preview frames and recorded/encoded frames.

In some examples, the ISP 118 can perform single-pass EIS during periods of little to no motion. Moreover, the single-pass EIS can implement a "non-future looking" EIS scheme where frames are stabilized as they are captured and displayed without using motion information from future frames (e.g., subsequently captured and buffered frames). In some cases, the non-future looking scheme implemented by single-pass EIS can stabilize frames without using "future" motion sensor measurements (e.g., motion sensor measurements, such as gyroscope measurements, identifying image sensor movements measured after the frames are captured) to stabilize the frames (e.g., without using motions detected by future motion sensor measurements). Instead, the non-future looking scheme implemented by single-pass EIS can stabilize frames based on "past" and/or current motion sensor measurements (e.g., motion sensor measurements, such as gyroscope measurements, identifying image sensor movements measured before or when the current frame is captured).

Single-pass EIS can thus limit the amount of delay in stabilizing and displaying frames, and can be used to stabilize frames when the user expects to see or preview the frames in real time or near real time. Since the single-pass EIS can also be used to stabilize frames being recorded/encoded, the single-pass EIS can reduce power consumption and increase processing efficiency by reducing the amount of operations implemented for both preview and recorded/encoded frames. Moreover, since single-pass EIS can be implemented for frames captured during periods of little to no motion, the power consumption and efficiency benefits described above can be achieved without (or with limited) sacrificing stabilization quality for recorded/encoded frames.

In dual-pass EIS, a separate EIS process can be performed for frames being recorded/encoded. This separate EIS process can be "future looking", meaning that the EIS process can use motion information from future frames. The separate EIS process performed for recorded/encoded frames can buffer a certain number of frames and use future motion sensor measurements to stabilize the buffered frames. The output of the stabilized frames can have some delay due to the buffering of the frames. The future motion sensor measurements associated with the buffered frames allow the separate EIS process for recorded/encoded frames to "look ahead" and determine changes in motion in the captured frames. This information allows the EIS process used for recording/encoding frames to provide better image stabilization quality for such frames. However, the separate EIS process can result in higher bandwidth requirement (e.g., due to the larger amount of data that needs to be transferred to-and-from the memory) and power consumption, since it involves storing and analyzing more data and performing additional computations. Thus, the separate EIS process in the dual-pass EIS can be used when a threshold amount of motion is detected and a separate, more-robust EIS process is selected to achieve a certain stabilization quality. The separate EIS process can be used for a processing path where a delay between the capture and output of video data is less of a concern, such as the video recording/encoding path.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 9.

Figure 2:
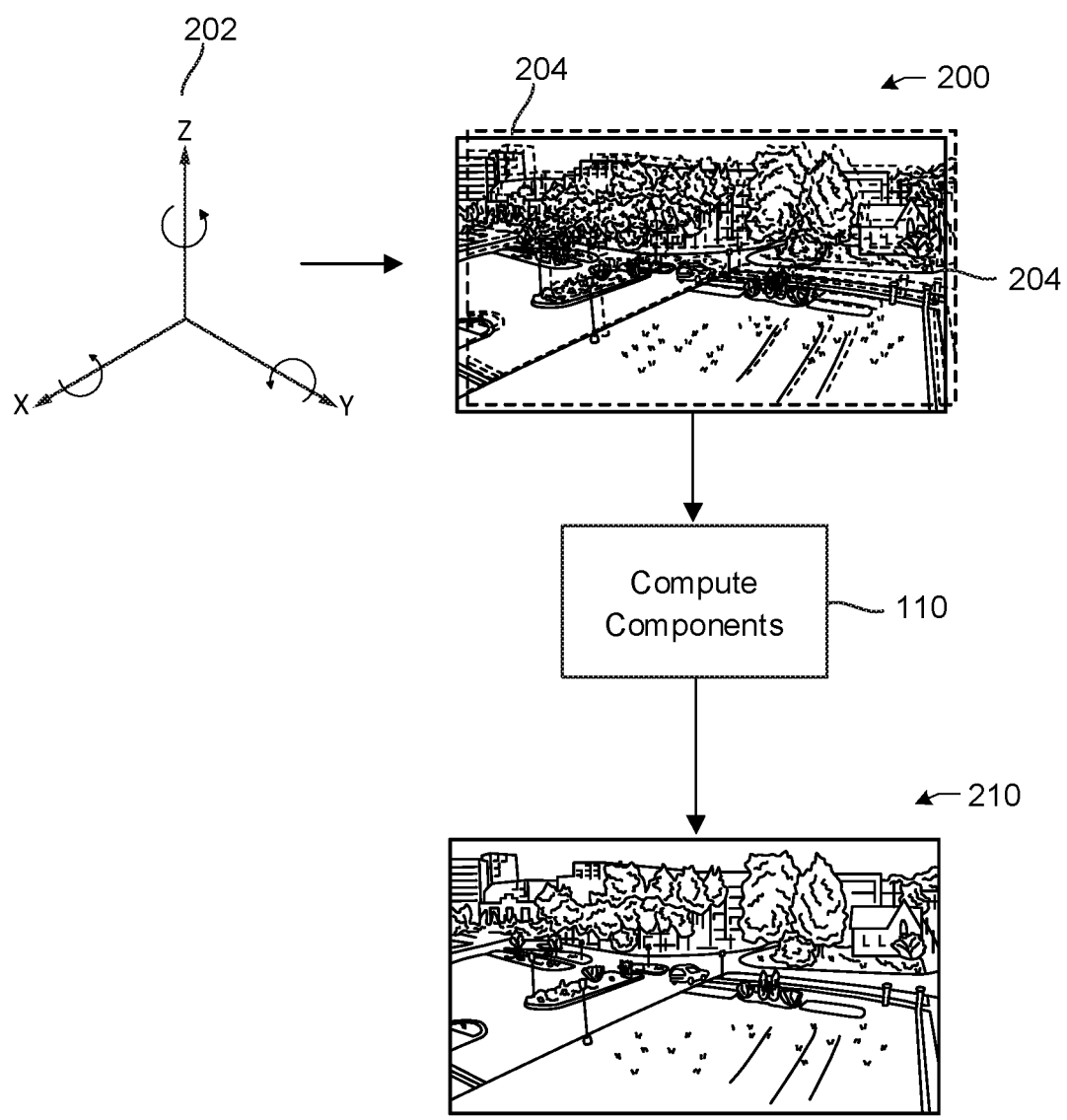
FIG. 2 illustrates an example unstabilized frame and a stabilized frame produced after electronic image stabilization is applied to the unstabilized frame, in accordance with some examples of the present disclosure.

FIG. 2 illustrates an example unstabilized frame 200 and a stabilized frame 210 produced after EIS is applied to the unstabilized frame 200. The unstabilized frame 200 includes motions 204 caused by movement 202 of the image sensor (e.g., image sensor 102 and/or image sensor 102 or 104) when capturing the unstabilized frame 200. The movement 202 can include, for example, vibrations, shaking or erratic movements of the image sensor (e.g., image sensor 102 and/or image sensor 104) caused by one or more forces on the image sensor, hand-jitter or unsteady holding, motion, etc. For example, the movement 202 can include shaking of the image sensor caused by unsteady handling of the image processing system (e.g., image processing system 100) implementing the image sensor by an operator of the image sensor, physical activity (e.g., walking, running, skiing, etc.) performed by the operator while handling the image sensor, etc. The motions 204 from the movement 202 can produce certain visual effects, such as blur, which reduce the visual quality or clarity of the unstabilized frame 200.

The ISP 118 can use the EIS engine 120 to stabilize the unstabilize frame 200 using EIS, resulting in a stabilized frame 210 with the motions 204 reduced or eliminated from the stabilized frame 210. The ISP 118 can stabilize the unstabilized frame 200 by removing or countering the motions 204 in the unstabilized frame 200 as described herein. This stabilization can improve the quality and clarity of the stabilized frame 210 relative to the unstabilized frame 200. For example, the stabilization can remove or reduce blurring or jitter in the unstabilized frame 200, resulting in an improvement in the quality and clarity of the stabilized frame 210.

Figure 3A:
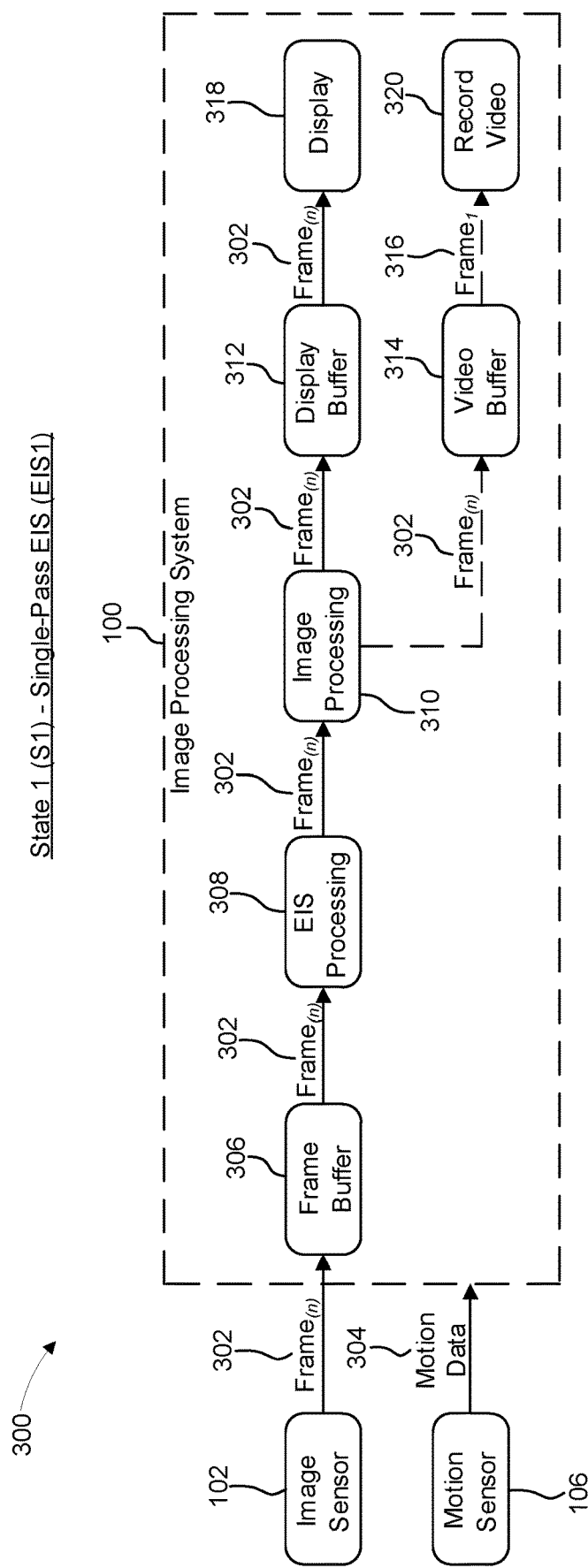
FIG. 3A is a diagram illustrating an example system flow for performing single-pass electronic image stabilization, in accordance with some examples of the present disclosure.

FIG. 3A is a diagram illustrating an example system flow 300 for performing single-pass EIS. As used herein, EIS1 refers to the EIS strategy/scheme implemented in the single-pass EIS process shown in the example system flow 300, including the EIS processing 308 described below with respect to frame 302. Moreover, as used herein, state 1 (S1) refers to the single-pass EIS processing state shown in the example system flow 300 and further described below.

Single-pass EIS is an EIS scheme where EIS processing for a frame is performed once for both preview and record, as opposed to dual-pass EIS where EIS processing for a frame is performed twice: once for preview and a second time for video record. For example, in single-pass EIS, a frame stabilized for preview or display can be reused for record/encode, thus avoiding a second EIS process when recording/encoding the frame. The single-pass EIS can therefore reduce the amount of bandwidth required, power, and/or resources used to stabilize the frame for preview and video record. In some cases, given the lower latency tolerance or needs of preview frames, the EIS1 strategy/scheme used in single-pass EIS can be based on the EIS process implemented for preview frames. As previously mentioned, the EIS process for preview frames does not use motion information from future frames (or uses a limited amount of motion information from future frames) to avoid increasing the processing and display/preview latency.

For example, to use motion information from future frames, a certain number of frames are typically buffered and the motion information associated with those buffered frames is then used to perform EIS for a previously-captured frame. This can introduce latency to the EIS processing of a frame which, in the case of preview frames, can result in a perceivable delay in previewed frames. Accordingly, to avoid such delays in preview frames, the EIS process for preview frames can avoid (or limit) use of motion information from future frames. Moreover, in some examples, to avoid (or limit) a reduction in stabilization quality for record/encode frames (which have a higher latency tolerance and can thus generally use motion information from future frames for EIS) resulting from the lack of (or limited) use of motion information from future frames in EIS1, single-pass EIS can be performed during periods of low (or no) motion. This way, single-pass EIS can reduce the bandwidth required, power, and resource use for EIS processing while satisfying the latency needs of preview frames and maintaining EIS quality for recorded/encoded frames.

With reference to the example system flow 300 shown in FIG. 3A, the image sensor 102 can provide a current frame 302 captured by the image sensor 102 to the image processing system 100. Moreover, the motion sensor 106 (e.g., gyroscope, accelerometer, IMU, etc.) can provide motion data 304 to the image processing system 100. The motion data 304 can be used by the image processing system 100 to estimate an amount of motion (e.g., shaking, movement, vibration, etc.) in the current frame 302 to correct or counter through EIS. In some examples, the motion data 304 can reflect or identify any motion detected/measured by the motion sensor 106 when the current frame 302 was captured. In some cases, the motion data 304 can include, for example, gyroscope measurements (e.g., roll, pitch, yaw), accelerometer measurements (e.g., acceleration), IMU measurements (e.g., velocity, angular rate, position, attitude, etc.), and/or other motion-related measurements.

The image processing system 100 can receive the current frame 302 and motion data 304 and perform EIS processing 308 (e.g., via EIS engine 120) for the current frame 302 using the motion data 304. Thus, the EIS processing 308 can perform EIS based on motion information associated with the current frame 302 and without using motion information from future frames. In some cases, the EIS processing 308 can use a limited amount of future motion information (e.g., motion information from one or more future frames) to perform EIS. For example, the EIS processing 308 can use a certain amount of future motion information if or when using such amount of future motion information does not cause (or is estimated to not cause) a perceivable delay (or causes a minimal or trivial delay) in preview frames.

In some examples, when performing EIS processing 308, the image processing system 100 can use the motion data 304 to calculate EIS parameters, such as cropping and/or rotation values, for the current frame 302. The image processing system 100 can then use the EIS parameters to stabilize the current frame 302 by, for example, cropping certain portions of the current frame 302 and/or rotating the current frame 302 a certain amount according to the EIS parameters.

In some examples, prior to performing the EIS processing 308, the image processing system 100 can store the current frame 302 in a frame buffer 306. The image processing system 100 can retrieve the current frame 302 from the frame buffer 306 to perform the EIS processing 308. In some cases, the frame buffer 306 can store the current frame 302 as well as a certain number of previously-captured frames received from the image sensor 102.

The image processing system 100 can also perform one or more image processing operations 310 on the current frame 302. The image processing system 100 can perform image processing operations 310 before and/or after performing the EIS processing 308. For example, in some cases, the image processing system 100 can perform one or more image processing operations prior to performing the EIS processing 308 and one or more additional image processing operations after performing the EIS processing 308. The one or more image processing operations 310 can include, for example and without limitation, a filtering operation, a demosaicing operation, a scaling operation, a color correction operation, a color conversion operation, a noise reduction filtering operation, a spatial filtering operation, an image enhancement operation, an image sensor correction operation (e.g., debayering), a chroma subsampling operation, a framerate conversion operation, a compression operation, and/or any other processing operations.

The image processing system 100 can then store the current frame 302 in a display buffer 312 used to store frames for preview/display, and a video buffer 314 used to store frames to be recorded/encoded. The image processing system 100 can obtain the current frame 302 from the display buffer 312 and can preview 318 (e.g., display, present, render) the current frame 302 on a display device such as a screen, and/or can transmit the current frame 302 to a screen (e.g., via screencast or mirroring).

The image processing system 100 can also retrieve a frame 316 in the video buffer 314 and record 320 (e.g., encode and/or store) the frame 316. The frame 316 can be a frame at the head of the video buffer 314. For example, the frame 316 can be the oldest frame in the video buffer 314 and/or the next frame from the video buffer 314 to be recorded. In some cases, the frame 316 can be a frame that was previously stabilized using EIS1 as described herein. In other cases, the frame 316 can be a frame that was previously stabilized during a dual-pass EIS process/period as described below with respect to FIG. 3B, or during a transition period as described below with respect to FIG. 3C.

Since the current frame 302 stored in the video buffer 314 was already stabilized, the image processing system 100 does not need to perform a separate EIS process to stabilize the current frame 302 for recording. When the current frame 302 is ready to be recorded (e.g., is next in the video buffer 314 and/or at the head of the video buffer 314), the image processing system 100 can retrieve the current frame 302 from the video buffer 314 and record 320 the current frame 302.

As illustrated above, the image processing system 100 can stabilize the current frame 302 once and reuse the stabilized frame for both preview 318 and record 320. Thus, the image processing system 100 can avoid performing a second or separate EIS process for recording, thereby increasing efficiency and reducing the bandwidth requirement of the system (e.g., due to a reduction in the amount of data that needs to be transferred to-and-from the memory), power consumption and resource usage.

Figure 3B:
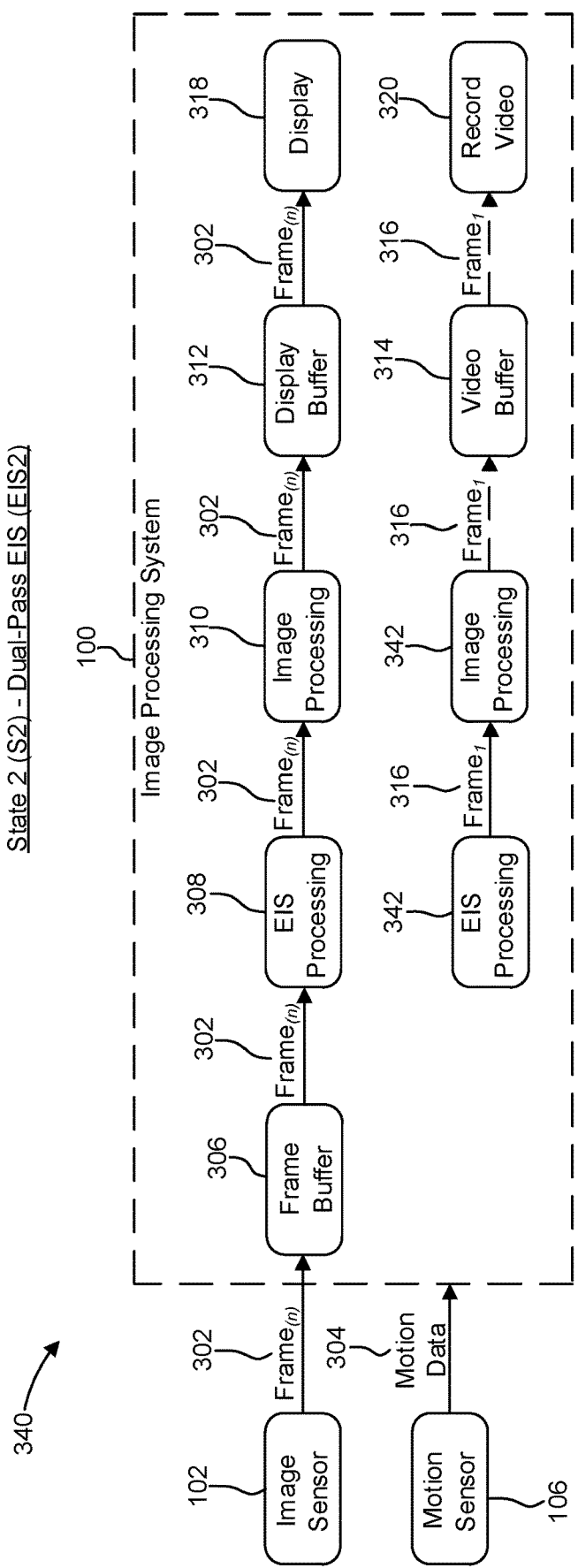
FIG. 3B is a diagram illustrating an example system flow for performing dual-pass electronic image stabilization, in accordance with some examples of the present disclosure.

FIG. 3B is a diagram illustrating an example system flow 340 for performing dual-pass EIS. As used herein, EIS2 refers to the EIS strategy/scheme implemented in the dual-pass EIS process shown in the example system flow 340, including the EIS processing 342 described below with respect to frame 316. Moreover, as used herein, state 2 (S2) refers to the dual-pass EIS processing state shown in the example system flow 340 and further described herein.

Dual-pass EIS is an EIS scheme where EIS processing for a frame is performed twice, including once for preview and once for video record. For example, in dual-pass EIS, a frame can be stabilized for preview or display without using (or using a limited amount of) motion information from future frames (e.g., using EIS1), and the same frame can be stabilized again for video record/encode using motion information from future frames (e.g., using EIS2). The EIS performed for video record/encode using motion information from future frames (e.g., EIS2) can provide higher quality stabilization, and thus can be used in situations or during periods when more motion is detected (and therefore more correction or compensation is needed for stabilization). Accordingly, in some examples, dual-pass EIS can be triggered during periods when the frames captured by the image sensor 102 have a threshold amount of motion and/or when higher quality stabilization (or more aggressive stabilization) is needed or desired.

In some cases, the state 2 for performing dual-pass EIS can be the default or initial state for EIS processing. When a period of no motion (or motion below a threshold) is detected and/or continues for a certain amount of time (or for a certain number of frames), the image processing system 100 can switch from the default state 2 for performing dual-pass EIS to state 1 for performing single-pass EIS. In some cases, when switching from state 2 to state 1, the image processing system 100 can first perform a graceful transition as further described below with respect to FIGS. 3C and 4. Moreover, if during the state 1 for performing single-pass EIS a threshold amount of motion is detected and/or continues for a certain amount of time (or for a certain number of frames), the image processing system 100 can transition back to state 2 for performing dual-pass EIS. This way, the image processing system 100 can dynamically or intelligently switch between single-pass EIS and dual-pass EIS to reduce overall bandwidth requirement of the system and power consumption while satisfying latency, stabilization quality, and other needs or requirements.

With reference to the example system flow 340 shown in FIG. 3B, the image sensor 102 can provide the current frame 302 captured by the image sensor 102 to the image processing system 100, and the motion sensor 106 can provide the motion data 304 to the image processing system 100. The image processing system 100 can receive the current frame 302 and motion data 304 and can store the current frame 302 in a frame buffer 306. In some cases, the frame buffer 306 can store the current frame 302 as well as a certain number of previously-captured frames received from the image sensor 102.

The image processing system 100 can retrieve the current frame 302 from the frame buffer 306 and process the current frame 302 for preview 318 (e.g., display, presentation, rendering, etc.). In particular, the image processing system 100 can perform (e.g., via EIS engine 120) the EIS processing 308 (e.g., EIS1) and the image processing 310 for the current frame 302, as previously described with respect to FIG. 3A. The image processing system 100 can then store the current frame 302 on the display buffer 312 for subsequent preview 318 via a display device.

In addition, the image processing system 100 can separately process frame 316 in the frame buffer 306 for video record (e.g., 320). The frame 316 can be a frame at the head of the frame buffer 306 (e.g., a past or older frame) to be processed for recording/encoding. For example, image processing system 100 can store frames captured by the image sensor 102 in the frame buffer 306 and maintain a certain number of frames in the frame buffer 306. As the image processing system 100 retrieves a frame (e.g., frame 316) from the frame buffer 306 for processing and subsequent recording/encoding, the image processing system 100 can use motion information from the frame being processed as well as motion information from other frames (e.g., future frames) in the frame buffer 306 to perform EIS processing 342 (e.g., EIS2) for that frame. Thus, the EIS processing 342 (e.g., EIS2) can use motion information from past and future frames to achieve higher quality stabilization.

Accordingly, when performing EIS processing 342 for frame 316 in the frame buffer 306, the image processing system 100 can use motion information associated with frame 316 and motion information associated with other frames (e.g., future frames) in the frame buffer 306. In some examples, when performing EIS processing 342 for frame 316, the image processing system 100 can also use the motion data 304 associated with the current frame 302.

In some cases, the image processing system 100 can use such motion information to calculate EIS parameters, such as cropping and/or rotation values, for use in stabilizing the frame 316. The image processing system 100 can then use the EIS parameters to stabilize the frame 316 by, for example, cropping certain portions of the frame 316 and/or rotating the frame 316 a certain amount according to the EIS parameters.

After performing EIS processing 342 for the frame 316, the image processing system 100 can perform one or more image processing operations 344 on the frame 316. The one or more image processing operations 344 can include, for example and without limitation, a filtering operation, a demosaicing operation, a scaling operation, a color correction operation, a color conversion operation, a noise reduction filtering operation, a spatial filtering operation, an image enhancement operation, an image sensor correction operation (e.g., debayering), a chroma subsampling operation, a framerate conversion operation, a compression operation, and/or any other processing operations.

The image processing system 100 can then store the frame 316 in the video buffer 314 used to store frames to be recorded/encoded. The image processing system 100 can obtain the frame 316 from the video buffer 314 and record 320 (e.g., encode and/or store) the frame 316. Once the image processing system 100 has recorded frame 316, it can retrieve the next frame in the frame buffer 306 and repeat the process (e.g., EIS processing 342, image processing 344, video buffer 314, and video record 320) for that next frame. As the image processing system 100 receives new frames from the image sensor 102 while in state 2 for performing dual-pass EIS, the image processing system 100 can similarly store the new frames in the frame buffer 306 to be processed in the future for video record as described with respect to frame 316, and can separately process the new frames for preview 318 as described with respect to the current frame 302.

As illustrated above, the image processing system 100 can stabilize and process the current frame 302 for preview/display (e.g., 318) and can separately stabilize and process the frame 316 for video record (e.g., 320). Thus, in dual-pass EIS, the image processing system 100 can perform EIS twice: once for preview (e.g., EIS1 for preview) and a second time for video record (e.g., EIS2 for video record).

Figure 3C:
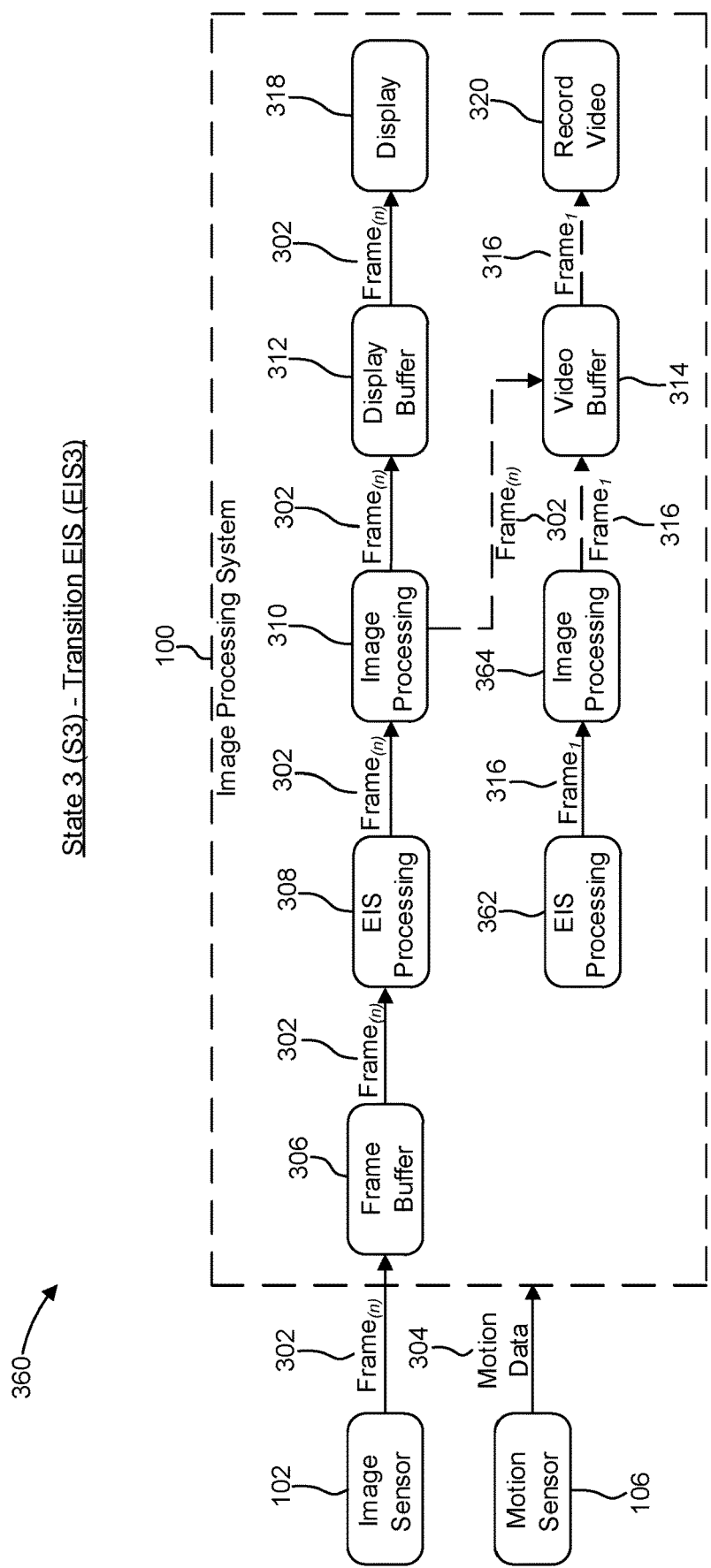
FIG. 3C is a diagram illustrating an example system flow for performing a transition between dual-pass electronic image stabilization and single-pass electronic image stabilization, in accordance with some examples of the present disclosure.

FIG. 3C is a diagram illustrating an example system flow 360 for performing a transition between dual-pass EIS and single-pass EIS (e.g., between EIS2 and EIS1). As used herein, EIS3 refers to a second EIS strategy/scheme (e.g., EIS processing 362 described below) in the transition EIS process shown in the example system flow 360, including EIS processing 362 as further described below, and state 3 (S3) refers to the transition EIS processing state shown in the example system flow 360.

The transition EIS process implemented in S3 and shown in FIG. 3C is an EIS strategy/scheme performed to transition from one EIS state to another EIS state. For example, the transition EIS process implemented in S3 and shown in FIG. 3C can be a strategy/scheme for gracefully transitioning from EIS2 in dual-pass EIS to EIS1 in single-pass EIS. In other words, the transition EIS process can be a strategy/scheme for gracefully transitioning between dual-pass EIS and single-pass EIS. In the transition EIS process, EIS processing is performed twice, including once (e.g., EIS1) for video preview (e.g., 318) and once (e.g., EIS3) for video record (e.g., 320). Here, a first EIS process (e.g., EIS1) can be performed to stabilize a current frame for subsequent previewing, without using (or using a limited amount of) motion information from future frames. A second EIS process (e.g., EIS3) can be separately performed to stabilize a frame in the frame buffer 306 for subsequent video recording/encoding. However, the second EIS process can take into account past and future motion information to gradually align the stabilization of frames from EIS2 in the dual-pass EIS with the stabilization of frames from EIS1 in the single-pass EIS, in order to avoid perceivable jerks or motions in the recorded video, which could otherwise result from a sudden transition from a higher stabilization quality process like the EIS2 to a lower stabilization quality process like the EIS1.

For example, since EIS2 in the dual-pass EIS can use motion information from future frames, in some cases (e.g., when there is motion) it can generate higher quality stabilization results than EIS1 in the single-pass EIS, which does not use motion information from future frames (or uses a limited amount). Thus, if the frames stabilized for video record using the dual-pass and single-pass EIS (e.g., using EIS1 and EIS2) are not gradually aligned when transitioning from the dual-pass EIS to the single-pass EIS (e.g., from EIS2 to EIS1) or vice versa, the difference in stabilization results between the frames in the recorded video that are stabilized before and after the switch from the dual-pass EIS (e.g., from EIS2) to the single-pass EIS (e.g., to EIS1) can cause the recorded video to have perceivable jerks or motion at the transition point(s) or frame(s). Accordingly, the transition EIS process in the example flow 360 can be implemented during a transition to gradually align the stabilization outputs for video record (e.g., the EIS1 and EIS2 outputs) and prevent or limit the appearance of jerks or motion in the video.

To align stabilization outputs during a transition, EIS3 (e.g., EIS processing 362 described below) can take into account the motion or stabilization trajectory in both future and past (and/or current) frames (e.g., frames stabilized via EIS1 and EIS2), and use that information to gradually align the frames stabilized before, during, and/or after the transition. For example, EIS3 can compare EIS1 parameters (e.g., motion correction values estimated for a current frame without using motion information from future frames) with EIS2 parameters (e.g., motion correction values estimated for a past or previous frame using motion information from future frames) to gradually align the EIS3 parameters (e.g., motion correction values) used for frames stabilized during the transition (e.g., during EIS3). Thus, the stabilization trajectory for EIS1 and EIS2 can be gradually aligned during the transition to produce a smooth and graceful transition.

To illustrate, with reference to the example system flow 360 shown in FIG. 3C, the image sensor 102 can provide the current frame 302 captured by the image sensor 102 to the image processing system 100, and the motion sensor 106 can provide the motion data 304 to the image processing system 100. The image processing system 100 can receive the current frame 302 and motion data 304 and store the current frame 302 in a frame buffer 306. In some cases, the frame buffer 306 can store the current frame 302 as well as a certain number of previously-captured frames received from the image sensor 102.

The image processing system 100 can retrieve the current frame 302 from the frame buffer 306 and process the current frame 302 for preview 318 (e.g., display, presentation, rendering, etc.). In particular, the image processing system 100 can perform the EIS processing 308 (e.g., EIS1) and the image processing 310 for the current frame 302, as previously described with respect to FIG. 3A. The image processing system 100 can then store the current frame 302 on the display buffer 312 for subsequent preview 318 via a display device. The image processing system 100 can also store the current frame 302 in the video buffer 314 for recording and use in the recorded video (and/or for aligning the stabilization trajectory of the current frame 302 and the frame 316 during the transition).

The EIS processing 308 (e.g., EIS1) can result in a certain stabilization trajectory and/or EIS parameters (e.g., motion correction values) for the current frame 302 (e.g., an EIS1 trajectory and/or EIS1 parameters). To provide a gradual transition from EIS2 to EIS1, EIS3 (e.g., EIS processing 362) can compare and align this stabilization trajectory and/or EIS parameters (e.g., the EIS1 parameters) with the stabilization trajectory and/or EIS parameters (e.g., motion correction values) from EIS2. Thus, the EIS processing 362 (e.g., EIS3) applied to frame 316, which can use motion information from past (and/or current) and future frames, can perform a gradual alignment of the frame 316 based on the EIS1 parameters (e.g., the EIS1 motion correction values) and the EIS2 parameters (e.g., the EIS2 motion correction values) and/or the respective stabilization or correction trajectories reflected in EIS1 and EIS2.

The EIS processing 362 can be performed for the video recording path. In particular, the image processing system 100 can separately process frame 316 in the frame buffer 306 for video record (e.g., 320) using motion information from future frames in the frame buffer 306. Thus, the image processing system 100 can perform the EIS processing 362 for frame 316 using the motion information from future frames. In some examples, the image processing system 100 can use the motion information from future frames to calculate EIS parameters, such as cropping and/or rotation values, for use in stabilizing the frame 316. The image processing system 100 can use the EIS parameters to stabilize the frame 316 by, for example, cropping certain portions of the frame 316 and/or rotating the frame 316 a certain amount according to the EIS parameters. In some cases, the image processing system 100 can adjust the calculated EIS parameters based on a comparison of EIS1 parameters (and/or EIS1 trajectory) and EIS2 parameters (and/or EIS2 trajectory), in order to provide stabilization alignment.

For example, the image processing system 100 can calculate EIS2 parameters (e.g., motion correction values using motion information from future frames) for the frame 316 at the EIS processing 362. The image processing system 100 can compare that EIS2 parameters with EIS1 parameters calculated for one or more other frames, such as the current frame 302, and shift the stabilization trajectory and/or adjust the motion correction values associated with the EIS2 parameters closer to those associated with EIS1. The shifted stabilization trajectory and/or adjusted motion correction values can represent EIS3 parameters that the EIS processing 362 can use to stabilize frames during the transition state 3 in order to provide a level of alignment between frames stabilized before, during, and/or after the EIS transition.

After performing EIS processing 362 for the frame 316, the image processing system 100 can perform one or more image processing operations 364 on the frame 316. The one or more image processing operations 364 can include, for example and without limitation, a filtering operation, a demosaicing operation, a scaling operation, a color correction operation, a color conversion operation, a noise reduction filtering operation, a spatial filtering operation, an image enhancement operation, an image sensor correction operation (e.g., debayering), a chroma subsampling operation, a framerate conversion operation, a compression operation, and/or any other processing operations.

The image processing system 100 can then store the frame 316 in the video buffer 314 used to store frames to be recorded/encoded. The image processing system 100 can obtain the frame 316 from the video buffer 314 and record 320 (e.g., encode and/or store) the frame 316. The video buffer 314 can include the current frame 302 stabilized without motion information from future frames and the frame 316 stabilized using EIS3. In some examples, as the image processing system 100 stabilizes additional frames in the frame buffer 306, it can gradually align them closer to the current frame 302. For example, the image processing system 100 can stabilize additional frames in the frame buffer 306 and gradually align them closer to the current frame 302 until the frame adjacent to (e.g., adjacent in time of capture and/or in the video sequence) the current frame 302 in the video sequence is aligned or substantially aligned with the current frame 302. When that frame and the current frame 302 are subsequently recorded/encoded, the recorded frames can reflect a smooth transition without (or with minimal) jerks or motion relative to each other.

Once the image processing system 100 has aligned the stabilization of frames in the video record path (e.g., between EIS1 and EIS2), the image processing system 100 can switch from EIS3 to EIS1 (if transitioning from EIS2) or to EIS2 (if transitioning from EIS1).

Figure 4:
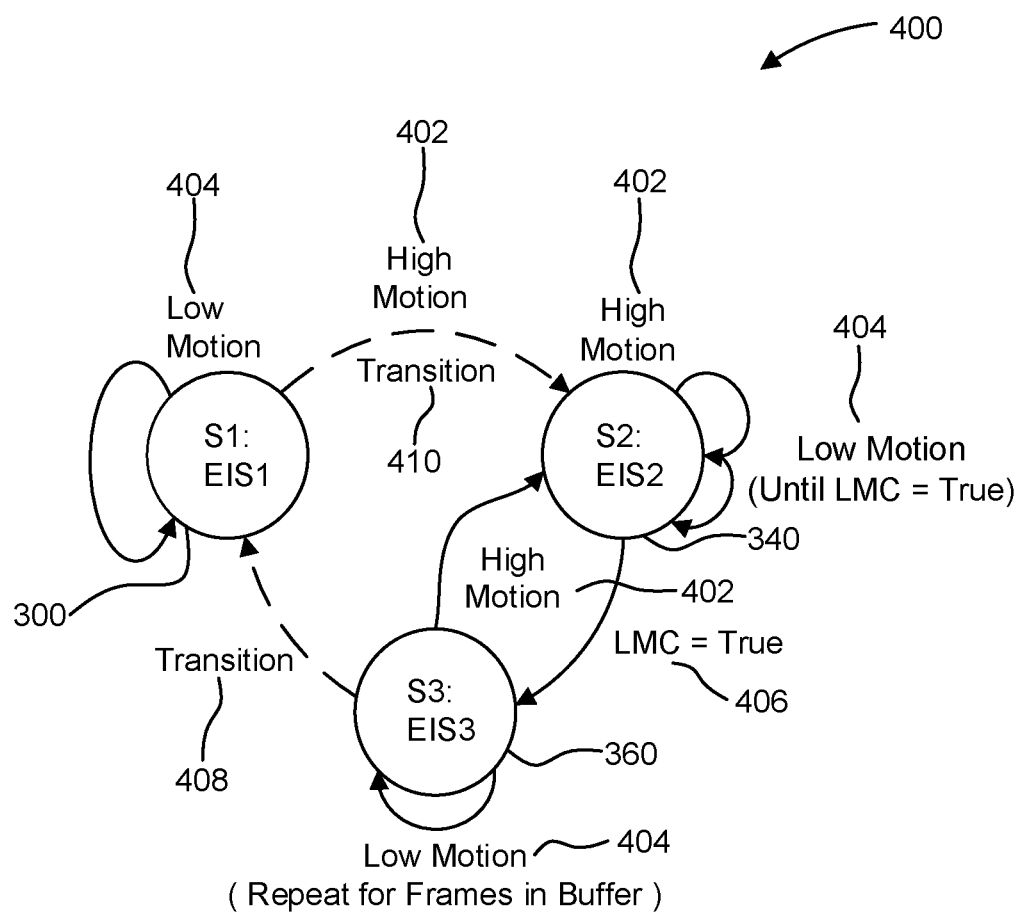
FIG. 4 illustrates an example state machine for dynamic and power-efficient electronic image stabilization, in accordance with some examples of the present disclosure.

FIG. 4 is an example dynamic EIS state machine 400 illustrating example EIS states, transitions, and transition triggers for dynamic and power-efficient EIS. In some examples, the initial state in the dynamic EIS state machine 400 can be state 340 (S2) for performing dual-pass EIS, which can include EIS1 for preview frames and EIS2 for video record. The image processing system 100 can continue to implement state 340 while high motion 402 is detected for captured frames, until low motion 404 is detected and a low motion confidence (LMC) condition 406 configured for triggering a switch to a transition state 360 (S3) is true or satisfied.

The high motion 402 can include an amount of motion that is above (or equal to) a configurable high motion threshold (e.g., a configurable threshold amount of pitch, yaw, roll, acceleration, vibration, velocity, and/or any other motion parameters). The low motion 404 can include no motion and/or an amount of motion that is below (or equal to) a configurable low motion threshold (e.g., a configurable threshold amount of pitch, yaw, roll, acceleration, vibration, velocity, and/or any other motion parameters). Moreover, the LMC condition 406 can define one or more conditions or triggers for switching from the state 340 (S2) to a transition state 360 (S3). In some cases, the one or more conditions or triggers can specify that the image processing system 100 should switch from state 340 (S2) to transition state 360 (S3) when detected motion is below a specified threshold for a configurable period of time and/or for a number of frames, and/or when EIS2 and EIS1 parameters (e.g., EIS2 and EIS1 motion correction values) remain within a specified range or limit for a configurable period of time and/or number of frames.

For example, the LMC condition 406 can define a threshold amount of motion for triggering a state switch and/or a threshold similarity between EIS2 and EIS1 parameters that should trigger a state switch. The LMC condition 406 can also define a period of time and/or number of frames for which the threshold amount of motion and/or the threshold similarity between EIS2 and EIS1 should be satisfied to trigger the state switch. To illustrate, the LMC condition 406 can specify that if the detected motion is below x amount of motion for y amount of time or n number of frames, where x, y, and n are positive integers, then EIS should switch from state 340 (S2) to transition state 360 (S3). As another example, the LMC condition 406 can specify that if a difference between EIS2 parameters and EIS1 parameters (e.g., a difference between EIS1 and EIS2 motion correction values) is within a predetermined limit z for y amount of time or n number of frames, where z, y, and n are positive integers, then EIS should switch from state 340 (S2) to transition state 360 (S3).

Thus, when the image processing system 100 determines that the LMC condition 406 is not satisfied or is false, the image processing system 100 can keep the EIS state at state

340 (S2). On the other hand, when the image processing system 100 determines that the LMC condition 406 is satisfied or true, the image processing system 100 can trigger a switch to transition state 360 (S3). The transition state 360 (S3) can be used to gradually transition from state 340 (S2) to state 300 (S1), which implements single-pass EIS using EIS1. During such a gradual transition, the EIS1 and EIS2 parameters and/or trajectories can be gradually aligned to provide a smooth transition from state 340 (S2) to state 300 (S1) and prevent or limit any perceivable jerking or motion between frames processed before, during, and/or after the transition (e.g., under EIS1, EIS2, and/or EIS3).

During the transition state 360 (S3), the image processing system 100 can implement EIS3 to gradually align the EIS parameters used to stabilize frames during the transition and provide a smooth transition to state 300 (S1). During this period, the image processing system 100 can also monitor the amount of motion sensed for captured frames to determine whether it should transition back to state 340 (S2). For example, if the image processing system 100 determines that the amount of motion sensed for new or currently captured frames indicates a change in motion from low motion 404 back to high motion 402, the image processing system 100 can return the EIS state to state 340 (S2).

As another example, if the image processing system 100 determines that the amount of motion sensed for new or currently captured frames indicates an increase in motion such that one or more conditions defined by the LMC condition 406 are no longer true or satisfied, the image processing system 100 can return the EIS state to state 340 (S2). To illustrate, if the image processing system 100 determines that the amount of motion detected for new or current frames is no longer below a threshold or a difference between EIS1 and EIS2 parameters has increased and is no longer within the predetermined limit, the image processing system 100 can return the EIS state to state 340 (S2).

On the other hand, if the image processing system 100 does not detect any conditions that would trigger a return to state 340 (S2), the image processing system 100 can continue to process frames at the transition state 360 (S3) according to EIS3 until a graceful transition 408 to state 300 (S1) is complete or effectuated. In some examples, the image processing system 100 can continue implementing EIS in the transition state 360 (S3) for a configurable period of time, at which point the graceful transition 408 is complete or effectuated. In other examples, the image processing system 100 can continue implementing EIS in the transition state 360 (S3) until it has applied EIS3 to any remaining frames in the frame buffer 306 and/or until it has applied EIS3 to any frames in the frame buffer 306 that are older than a current frame and/or any frames that have been processed using EIS1, at which point the graceful transition 408 is complete or effectuated. In yet other examples, the image processing system 100 can continue implementing EIS in the transition state 360 (S3) until EIS1 and EIS2 parameters are aligned (or nearly aligned) or the difference between the EIS1 and EIS2 parameters is below a threshold.

Once the graceful transition 408 is complete, the image processing system 100 can switch to state 300 (S1) and process any frames at state 300 (S1) according to single-pass EIS using EIS1. The image processing system 100 can continue at state 300 (S1) as long as it continues to detect a low motion 404 for captured frames. When the image processing system 100 detects a high motion 402 and/or a threshold variation in EIS1 and EIS2 parameters, the image processing system 100 can transition 410 back to state 340 (S2). In some examples, the threshold variation in EIS1 and EIS2 parameters can be a configurable amount of variation specified for a transition 410 from state 300 (S1) to state 340 (S2). In other examples, the threshold variation in EIS1 and EIS2 parameters can be an amount of variation that exceeds a threshold variation defined by the LMC condition 406 for switching from state 340 (S2) to state 300 (S1) and/or transition state 360 (S3).

In some cases, the transition 410 from state 300 (S1) to state 340 (S2) can be a gradual transition, as described above with respect to the graceful transition 408 and the transition state 360 (S3). In other cases, the transition 410 from state 300 (S1) to state 340 (S2) can be immediate or nearly immediate. For example, in some cases, when the image processing system 100 determines that it should transition 410 from state 300 (S1) to state 340 (S2), the image processing system 100 can immediately switch to state 340 (S2) such that any subsequent frames are processed under state 340 (S2) until all frames are processed or another switch to the transition state 360 (S3) is triggered.

Figure 5:
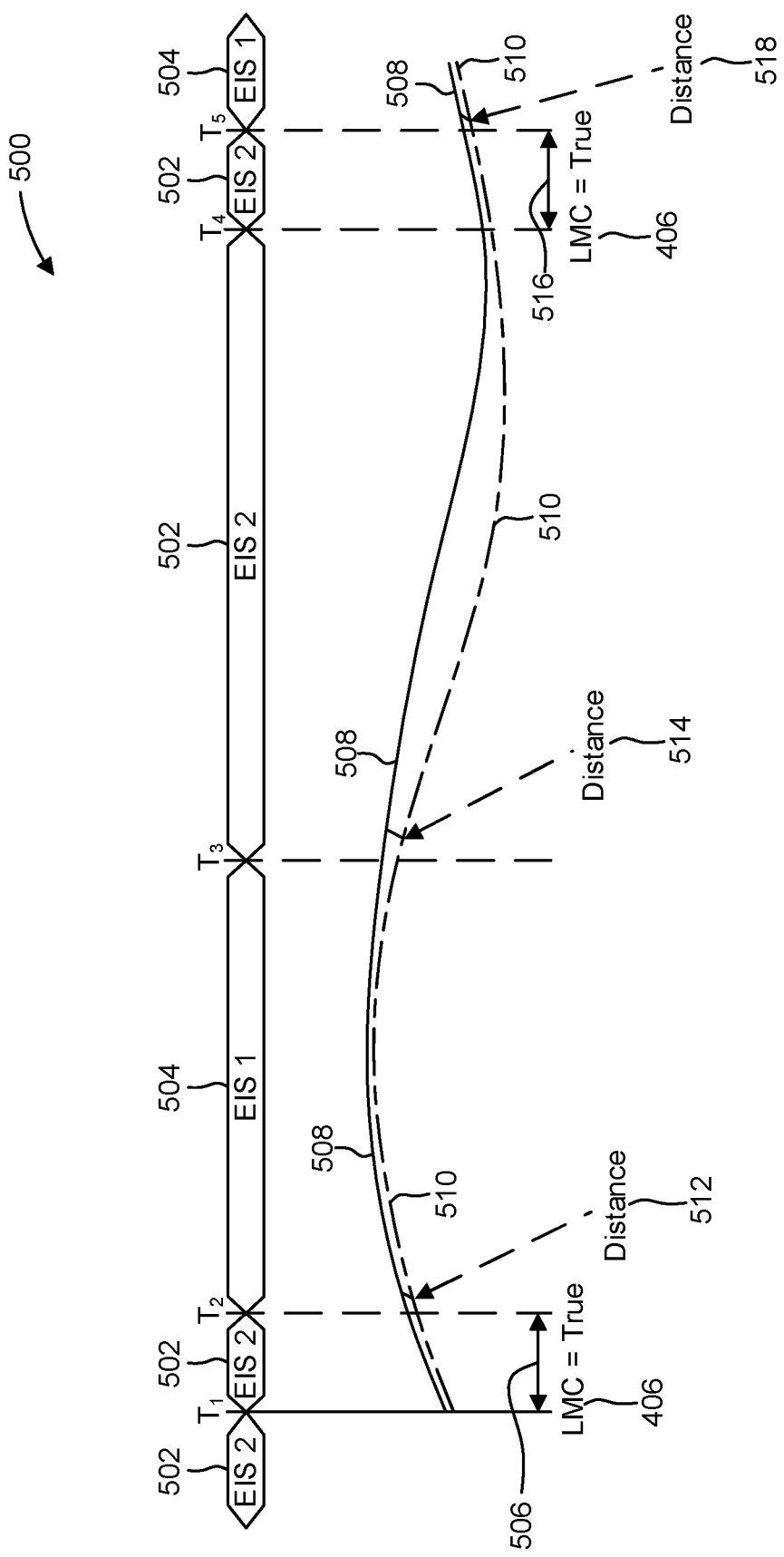
FIG. 5 illustrates example electronic image stabilization states and transitions, in accordance with some examples of the present disclosure.

FIG. 5 illustrates example EIS states and transitions corresponding to various EIS parameters. In this example, frames are first stabilized according to EIS2 parameters 502 estimated for stabilizing the frames. The EIS parameters 502 can be calculated during a dual-pass EIS state (e.g., state 340 (S2)) implementing EIS2. In some cases, the dual-pass EIS state can be the default or initial state for processing frames.

A period 506 from time 1 (T1) to time 2 (T2) indicates that an amount of motion detected for frames has decreased to a level within or below a threshold amount defined by the LMC condition 406 for triggering a switch to single-pass EIS using EIS1. In FIG. 5, the LMC condition 406 is shown as true for the period 506 from T1 to T2, which indicates that a sufficiently low amount of motion for triggering a switch to single-pass EIS using EIS1 has remained throughout the period 506 and the LMC condition 406 for switching to the single-pass EIS using EIS1 is or has been satisfied.

Moreover, the EIS curve 508 in FIG. 5 represents the EIS trajectory for EIS2, and the EIS curve 510 represents the EIS trajectory for EIS1. As illustrated, a distance 512 (e.g., a difference) between the EIS curve 508 and the EIS curve 510 is relatively small during and after the period 506, indicating a low amount of motion during such period and/or a smaller difference between EIS2 and EIS1 parameters. The amount of motion and/or the difference between EIS2 and EIS1 parameters reflected by the distance 512 is within a range or threshold for switching from dual-pass EIS to single-pass EIS as defined by the LMC condition 406 and reflected by the switch from EIS2 parameters 502 used during the period 506 and the EIS1 parameters 504 after the period 506.

Since the LMC condition 406 is or has been satisfied, the EIS process can switch to single-pass EIS, which implements EIS1 for stabilizing frames. The EIS1 parameters 504 represent the EIS parameters calculated using EIS1 after switching to single-pass EIS. In some examples, the switch from dual-pass EIS to single-pass EIS reflected by the change from EIS2 parameters 502 in the period 506 to the EIS1 parameters 504 after the period 506 can be performed after a transition (e.g., 408) implemented by a transition state (e.g., 360). During such transition, the distance 512 between the EIS curve 508 associated with the EIS2 parameters 502 and the EIS curve 510 associated with the EIS1 parameters 504 can be reduced and/or smoothened to provide a more graceful or seamless transition between EIS1 and EIS2. In other words, the gap between the EIS curve 508 and the EIS curve 510 can be reduced or closed to provide a smooth transition.

At time 3 (T3), a switch from EIS1 parameters 504 back to EIS2 parameters 502 indicates that a switch to dual-pass EIS using EIS2 was triggered and implemented. Here, the distance 514 between the EIS curve 510 associated with the EIS1 parameters 504 and the EIS curve 508 associated with the EIS2 parameters 502 has increased, indicating an increase in the amount of motion and/or the difference between the EIS1 parameters 504 and the EIS2 parameters 502. Such distance 514 can reflect a triggering condition for the switch back to dual-pass EIS. In some cases, a gradual transition EIS (akin to EIS3) can be implemented when switching from the single-pass EIS back to the dual-pass EIS to reduce the distance 514 between the EIS1 parameters 504 and the EIS2 parameters 502 and provide a smoother and/or more seamless transition from EIS2 to EIS1.

Time 4 (T4) illustrates the beginning of a period 516 from T4 to time 5 (T5) having a lower amount of motion and in which a distance 518 between the EIS2 curve 508 associated with the EIS2 parameters 502 and the EIS1 curve 510 associated with the EIS1 parameters 504 has decreased within an acceptable range defined by the LMC condition 406 for switching from EIS2 to EIS1. Accordingly, as illustrated in FIG. 5, the LMC condition 406 during the period 516 from T4 to T5 is or has been satisfied, thus triggering a switch to EIS1 after T5. In some cases, before switching from EIS2 to EIS1, a graceful transition (e.g., 408) can be implemented by a transition state (e.g., 360) using EIS3, as previously described.

Figure 6:
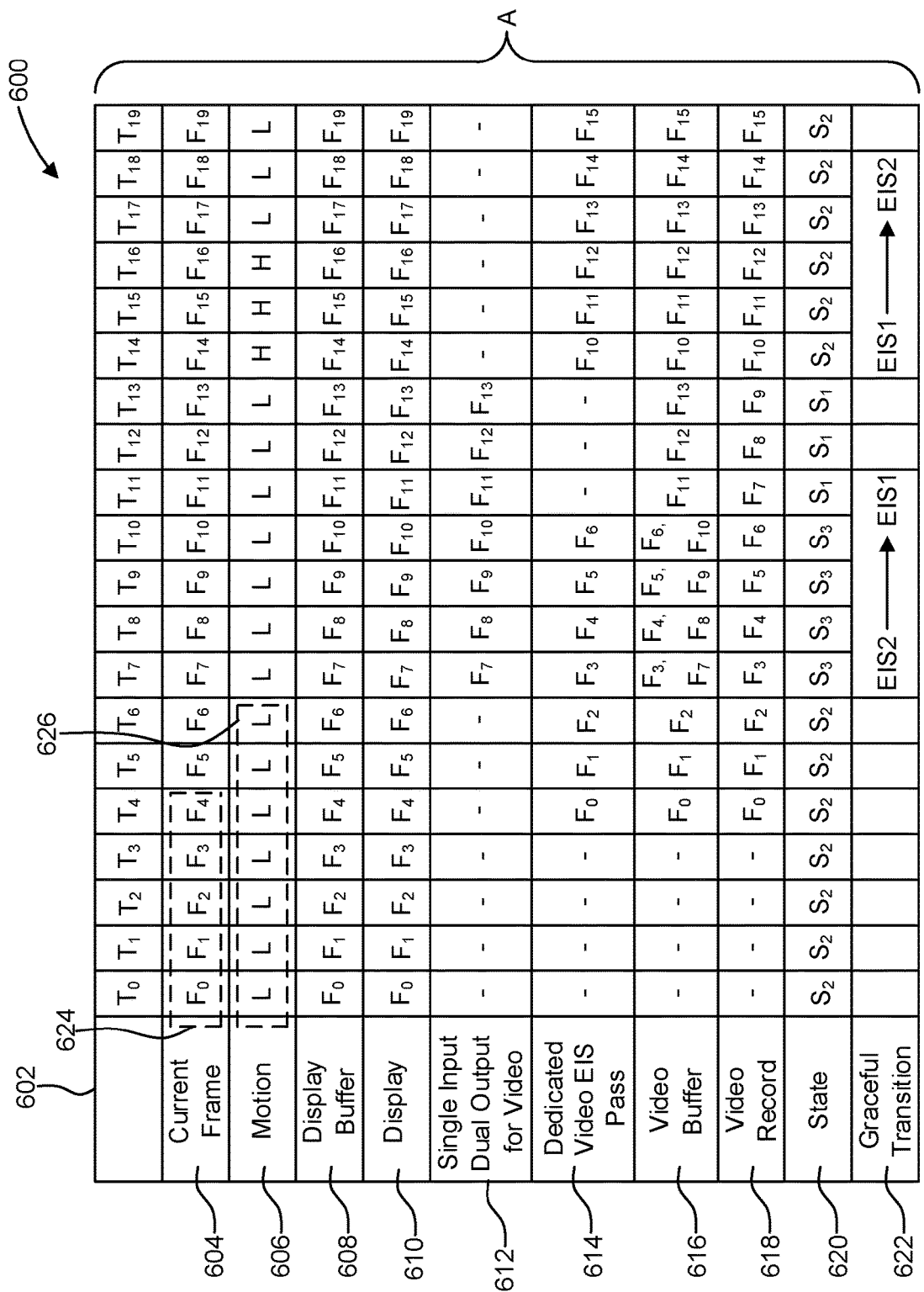
FIG. 6 illustrates an example timeline of electronic image stabilization operations and states, in accordance with some examples of the present disclosure.

FIG. 6 illustrates an example timeline 600 of EIS operations and states in an example dynamic EIS process. For simplicity and illustration purposes, the latencies between display and frame-arrivals in FIG. 6 are assumed to be zero. In addition, latencies between the data in rows 614, 616, and 618 are assumed to be zero for simplicity. Moreover, the latencies shown in FIG. 6 are provided for illustration purposes. One of ordinary skill in the art will recognize and/or infer the implied and/or illustrated concepts regardless of the simplistic or illustrative assumptions in FIG. 6.

In the example timeline 600, row 602 shows the timestamps of frames captured by an image sensor device (e.g., 102), and row 604 ("Current Frame") identifies the current frame generated by the image sensor device at the associated timestamp from row 602. Row 606 ("Motion") shows the amount of motion detected for an associated frame from row 604. Here, "L" refers to low motion, which can include no motion or motion below a certain threshold, and "H" refers to high motion, which can include an amount of motion above a certain threshold.

Row 608 ("Display Buffer") shows the EIS1 output for a current frame from row 604, and row 610 ("Display") shows the current frame being used for preview/display (e.g., the current frame being presented/rendered on a display). Row 612 ("Single Input Dual Output for Video") shows whether a single-pass EIS state (e.g., S1) is active at a particular timestamp from row 602. Here, if a frame is identified on a particular cell of row 612, it indicates that single-pass EIS (e.g., S1) is enabled at that time and the identified frame is being written to the video buffer (e.g., 314).

Row 614 ("Dedicated Video EIS Pass") indicates whether EIS2 is active for a video record pass in a dual-pass EIS state at a particular timestamp. In other words, row 614 shows which frames are processed using EIS2 for the video record path. If a cell in row 614 does not identify a frame, it indicates that EIS2 is not being applied to any frames at the timestamps associated with that cell. On the other hand, if a cell in row 614 identifies a frame, it indicates that the identified frame is being processed using EIS2 for the video record path.

Row 616 ("Video Buffer") identifies at what timestamp specific frames are written to the video buffer (e.g., 314). For example, if a cell in row 616 corresponding to timestamp T1 does not identify a frame, this indicates that no frame is written to the video buffer at T1. On the other hand, if a cell in row 616 corresponding to timestamp T5 identifies frame 5, this indicates that frame 5 is written to the video buffer at T5.

Row 618 ("Video Record") shows the frames being encoded at specific timestamps. If a cell in row 618 does not identify a frame it means that no frames are being encoded at a timestamp associated with the cell. If the cell instead identifies a frame, this indicates that the frame identified is being encoded at the timestamp associated with the cell. Row 620 ("State") shows what state (e.g., S1 corresponding to single-pass EIS, S2 corresponding to dual-pass EIS, or S3 corresponding to a transition state) is enabled at each timestamp from row 602. Row 622 ("Graceful Transition") identifies when (at what timestamp) a transition between EIS1 and EIS2 (e.g., from EIS1 to EIS2 and/or from EIS2 to EIS1) occurs.

Box 624, which in FIG. 6 encompasses current frames from timestamp T0 to timestamp T4, identifies the amount of sensor data from future frames used to perform EIS2 for a particular frame. For example, if box 624 includes frame 0 to frame 4 at timestamps T0 to T4, then box 624 indicates that a frame (e.g., frame 0 in row 614) to be encoded for video record is processed via EIS2 using motion information from frame 0 to frame 4 encompassed in the box 624. Thus, box 624 can indicate the future frame depth for motion information used in EIS2 and/or the frame buffer depth.

Box 626 identifies an LMC period defined by an LMC condition (e.g., 406). For example, in FIG. 6, the box 626 encompasses cells from timestamp T0 to timestamp T6 in row 602. This indicates that the LMC period defined by the LMC condition (the period during which a transition triggering condition should be satisfied to trigger a switch to a different EIS state) includes 7 frames and/or 7 timestamps (e.g., the current frame at each timestamp from T0 to T6).

As previously noted, row 610 in the example timeline 600 indicates that frames F0 to F31 are output to display/preview at timestamps T0 to T31 respectively, and row 612 indicates that single-pass EIS is not active from T0 to T6 and from T14 to T23. Moreover, row 614 indicates that EIS2 is not active from T0 to T3 but EIS2 is applied to frames F0 to F6 respectively at timestamps T4 to T10, and EIS2 is applied to frames F10 to F23 respectively at timestamps T14 to T27.

Row 606 also indicates that low motion is or has been detected during the LMC period reflected by box 626 (e.g., timestamps T0 to T6). The low motion throughout the LMC period indicates that the LMC condition is or has been satisfied, which triggers a switch from a dual-pass EIS state (S2) enabled for that period (e.g., T0 to T6) as reflected in row 620, to a single-pass EIS state (S1). However, as previously explained, in some examples, prior to switching from EIS2 to EIS1, EIS3 can be implemented during a transition state (S3) to avoid jitter, jerks, motion, etc., resulting from the switch. Such transition after the LMC period reflected by box 626 is shown in row 622. Here, row 622 indicates that a transition from EIS2 to EIS1 is performed at timestamps T7 to T11. As indicated in row 622, a transition state S3 is implemented from timestamps T7 to T10, until EIS1 is performed for frame F11 at timestamp T11, reflecting the completion of the switch to single-pass EIS (S1). Row 612 indicates that, during the single-pass EIS (S1) period which includes timestamps T11 to T13 as reflected in row 620, EIS1 is applied to frames F11 to F13 and the EIS1 output for frames F11 to F13 can be used for both the preview/display output and the video record output.

Moreover, in row 614, which as previously noted shows which outputs are based on EIS2 in a dual-pass EIS state, there are no frames identified for timestamps T0 to T3 even though row 620 indicates that a dual-pass EIS state (S2) that implements EIS2 is active during timestamps T0 to T3. This can reflect the amount of delay caused for EIS2 by the amount of sensor data used for future frames (and/or the buffer depth) as reflected by box 624. For example, box 624 indicates that, for EIS2, the motion information used to perform EIS2 for frame F0 includes the motion information for the frames captured at timestamps T0 to T4; namely, frames F0 to F4. Thus, before frame F0 is processed using EIS2, there is a delay from timestamps T0 to T3 corresponding to delay until frames F0 to F4—used here for EIS2 motion information—are all captured and buffered.

Accordingly, as reflected in row 614, since the last frame (e.g., frame F4) for which motion information is used to perform EIS2 for F1 is not captured and buffered until timestamp T4, the EIS2 processing of frame F0 using the motion information from frames F0 to F4 is delayed until timestamp T4. At timestamp T4, EIS2 processing is performed for frame F0 using motion information from frames F0 to F4. Similarly, at timestamp T5, EIS2 processing is performed for frame F1 using motion information from frames F1 to F5. As shown in row 614, frames F2 to F6 are similarly processed using EIS2 and motion information from future frames.

At timestamp T14, row 606 indicates that high motion is or has been detected until timestamp T16. Accordingly, as reflected in rows 620 and 622, a graceful transition period for switching from single-pass EIS (S1) to dual-pass EIS (S2), as triggered by the high motion detected, is performed at timestamps T14 to T18. The switch from single-pass EIS to dual-pass EIS can include a switch from EIS1 to EIS2 for the video record path (e.g., frames to be encoded/recorded). During this period, frames F10 to F14 in row 614 are processed for the video record pass of a dual-pass EIS using EIS2, and frames F14 to F18 are processed for the preview pass of the dual-pass EIS using EIS1 (as shown in rows 608 and 610). Moreover, during the transition period, the EIS parameters (e.g., the motion compensation parameters) used to process frames F10 to F14 using EIS2 can be adjusted to better align with the EIS parameters used to process any of frames F7 to F9 using EIS1 (as reflected in row 612) and/or one or more of the frames processed using EIS2 after the transition period (e.g., starting with frame F15 at timestamp T19). In other words, the EIS2 process performed during the transition period can align EIS1 and EIS2 parameters and used the aligned EIS parameters (e.g., EIS3 parameters) to stabilize frames during the transition period in a way that provides a smooth, seamless, and/or gradual transition between the single-pass EIS (S1) and the dual-pass EIS (S2).

As shown in rows 614 and 620, starting at timestamp T19 (and frame F15) after the transition period, frames for the video record pass (e.g., the second pass in the dual-pass EIS state S2) are stabilized using EIS2. However, row 606 indicates that a change from high motion to low motion was detected at timestamp T17 and the low motion continues through timestamp T31. Thus, since the low motion continues throughout the LMC period defined by the LMC condition for switching back to single-pass EIS (S1), the LMC condition for switching to single-pass EIS (S1) is satisfied at timestamp T23, which reflects the end of the LMC period. Thus, at timestamp T24, a transition state (S3) is initiated (as reflected in rows 620 and 622) to gracefully transition from EIS2 in a dual-pass EIS state (S2) to EIS1 in a single-pass EIS state (S1). The transition state (S3) continues from timestamp T24 to timestamp T27, until the switch to EIS1 is completed starting at timestamp T28.

During this transition period, frames F24 to F27 are processed using EIS1 and used for both preview/display and video record, as shown in row 612. Moreover, those frames that are older than frame F24 and newer that the last frame (frame F19) processed before the transition period (e.g., frames F20 to F23) can be processed using EIS3 (or EIS2) and gradually aligned with frame F24 so the transition from frame F23 to frame F24 (which is processed using EIS1) is smooth and does not reflect jerking, jitter, or other relative motion. At timestamps T28 to T31, the frames are processed using EIS1 in a single-pass EIS state (S1), as shown in rows 612 and 620.

In some cases, if an LMC condition is satisfied and a transition state (S3) is triggered for switching EIS states, and a change in motion is detected during the transition state, the transition state can be terminated and the EIS state can return to the state before the transition state was initiated. For example, if the LMC condition is satisfied at timestamp T23 and a transition state (S3) for transitioning from EIS2 for dual-pass EIS (S2) to EIS1 for single-pass EIS (S1) is initiated at timestamp T24, and a change from low motion to high motion is detected during the transition state (S3) at timestamp T24, then at timestamp T25 the EIS processing can return to EIS2 and the state can return to dual-pass EIS.

Figure 7A:
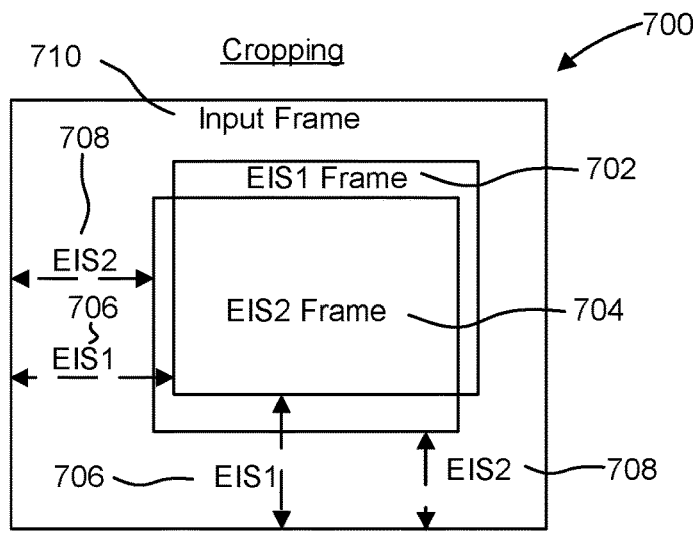
FIG. 7A illustrates an example alignment of electronic image stabilization cropping parameters for a frame processed using single-pass electronic image stabilization and a frame processed using dual-pass electronic image stabilization, in accordance with some examples of the present disclosure.
Figure 7B:
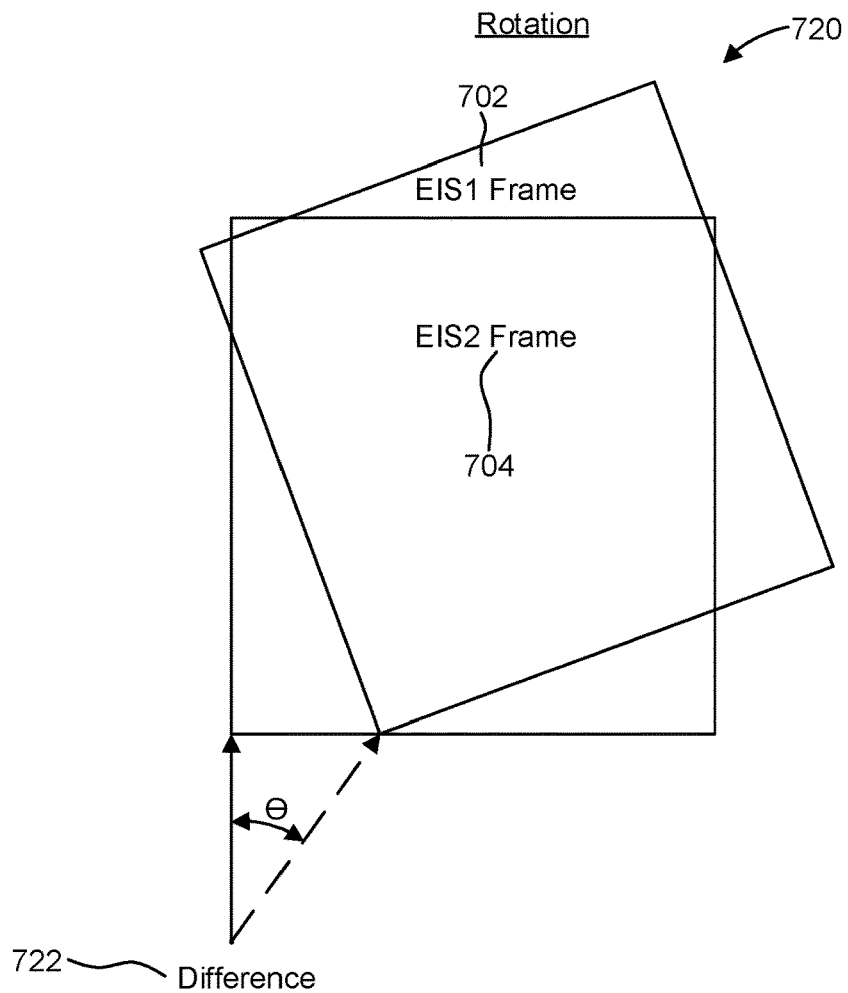
FIG. 7B illustrates an example alignment of electronic image stabilization rotation parameters for a frame processed using single-pass electronic image stabilization and a frame processed using dual-pass electronic image stabilization, in accordance with some examples of the present disclosure.

In some examples, the EIS parameters used to stabilize frames can include cropping parameters and rotation parameters, as shown in FIGS. 7A and 7B. The cropping parameters can indicate which portions (and/or how much) of an image should be cropped or removed to counter (or compensate for) any shaking or motion in the image and produce a stabilized image of a desired resolution. The rotation parameters can indicate an amount of rotation that should be applied to an image to counter (or compensate for) any rotation in the image caused by shaking or motion and produce a stabilized image.

FIG. 7A illustrates example EIS cropping comparison 700 between an EIS1 frame 702 generated using EIS1 parameters 706 and an EIS2 frame 704 generated using EIS2 parameters 708. The EIS1 frame 702 and the EIS2 frame 704 in this example are generated from an input frame 710 obtained from an image sensor. The EIS1 parameters 706 can be used to generate the EIS1 frame 702 using EIS1, and the EIS2 parameters 708 can be used to generate the EIS2 frame 704 using EIS2. In some examples, the EIS1 parameters 706 and the EIS2 parameters 708 can be compared with each other and aligned during a gradual transition (e.g., 360) between EIS1 and EIS2. The alignment can take into account a difference in EIS1 and EIS2 parameters 706 and 708 for the EIS1 frame 702 and the EIS2 frame 704.

In this example, the input image 710 is larger than the EIS1 frame 702 and the EIS2 frame 704. Further, the EIS1 frame 702 processed using EIS1 and the EIS2 frame 704 processed using EIS2 have had respective image portions from the input image 710 cropped to produce a stabilized frame for EIS1 and EIS2 with a desired resolution. The origin and/or angle of the crop can be dictated by the EIS algorithm used for the EIS processing. Moreover, the cropping can include cropping of portions from the input image 710 in one or more directions (e.g., up, down, left, right). In some examples, to align the frames 702 and 704 (and/or the EIS1 and EIS2 cropping parameters), the cropping parameters used for frame 702 can be adjusted to gradually align the EIS1 parameters 706 and the EIS2 parameters 706. For example, the origin and angle of the crop between the EIS1 frame 702 and the EIS2 frame 704 can be adjusted to gradually align them.

In some examples, the cropping alignment between EIS1 parameters 706 and EIS2 parameters 708 can result in further (or less) stabilization in one or more transition frame(s) to account for differences in the motion or jerking stabilized in each frame.

FIG. 7B illustrates an example alignment 720 of EIS rotation parameters for a frame 702 processed using EIS1 and a frame 704 processed using EIS2. The alignment 720 can be performed during a gradual transition (e.g., 360) between EIS1 and EIS2. The alignment 720 can take into account a difference 722 in EIS1 and EIS2 rotation parameters for the frames 702 and 704. The difference 722 in EIS1 and EIS2 rotation parameters can reflect a difference in rotation angles.

In this example, the frame 704 processed using EIS2 has been rotated a certain amount to produce a stabilized frame with a desired resolution. The frame 702 processed using EIS1 has also been rotated a different amount to produce a stabilized frame with a desired resolution. The difference 722 in the EIS1 and EIS2 rotation parameters indicates that the frame 704 has been rotated more than frame 702, to counter additional shaking/motion detected by EIS2. In some examples, to align the frames 702 and 704 (and/or the EIS1 and EIS2 rotation parameters), the rotation parameters used for frame 702 can be adjusted to increase the amount of rotation for frame 702 and reduce the difference 722 in the EIS1 and EIS2 rotation parameters associated with the frames 702 and 704.

In other examples, to align the frames 702 and 704 (and/or the EIS1 and EIS2 rotation parameters), the rotation parameters used for frame 704 can be adjusted to reduce the amount of rotation for frame 704 and reduce the difference 706 in the EIS1 and EIS2 rotation parameters associated with the frames 702 and 704.

FIG. 8 illustrates an example method 800 for dynamic, power-efficient EIS. At block 802, the method 800 can include collecting one or more motion measurements (e.g., Motion Data 202) associated with an image sensor (e.g., 102 or 104). In some examples, the one or more motion measurements can be calculated by a motion sensor (e.g., 106). Moreover, in some examples, the one or more motion measurements can be based on a movement of the image sensor while the image sensor captures a sequence of frames (e.g., a video). In some cases, the one or more motion measurements can include a pitch, roll, yaw, acceleration, velocity, angular rate, attitude, and/or any other motion of the image sensor measured or sensed by the motion sensor while the image sensor captures the sequence of frames.

At block 804, the method 800 can include calculating a first set of parameters (e.g., EIS2 parameters) and a second set of parameters (e.g., EIS1 parameters) for counteracting (e.g., stabilizing, correcting and/or compensating for) motion in a first frame (e.g., current frame 302) from the sequence of frames. The motion in the first frame can include, for example, vibrations, shaking, movement, jitter, etc. The first set of parameters and second set of parameters can include EIS parameters such as, for example, cropping parameters and rotation parameters. In some examples, the first set of parameters can be based on the one or more motion measurements, which can correspond to the sequence of frames, and the second set of parameters can be based on a portion of the one or more motion measurements corresponding to a movement of the image sensor while capturing the first frame.

For example, the first set of parameters can be based on motion measurements corresponding to a sequence of frames including the first frame and one or more future or newer frames (e.g., frames captured after the first frame), and the second set of parameters can be based on motion measurements corresponding to the first frame. Thus, in this example, the first set of parameters can be based on future motion information from future frames (as well as current motion information) and the second set of parameters can be based on current motion information for the current frame (e.g., the first frame).

At block 806, the method 800 can include, in response to determining that a difference between the first set of parameters and the second set of parameters is above a threshold, switching from a dual-pass stabilization process (e.g., dual-pass EIS 340) enabled for the first frame to a single-pass stabilization process (e.g., single-pass EIS 300) for the second frame. In some examples, the single-pass stabilization process can include an EIS1 single motion stabilization pass (e.g., EIS processing 308) used for both a frame preview path/process (e.g., 318) and a video record path/process (e.g., 320). In some cases, the difference between the first set of parameters and the second set of parameters can be above the threshold when an amount of motion between the first frame and the second frame is above a threshold amount of motion. Moreover, in some examples, the threshold amount of motion can be defined by an LMC condition (e.g., 406), and the single-pass stabilization process can be enabled based on a determination that the LMC condition is satisfied.

At block 808, the method 800 can include adjusting (e.g., stabilizing), as part of the single motion stabilization pass, the second frame according to a third set of parameters (e.g., EIS1 parameters) for counteracting motion in the second frame. In some examples, the third set of parameters can be based on a portion of the one or more motion measurements (e.g., motion data 304) corresponding to a movement of the image sensor while capturing the second frame.

In some aspects, the method 800 can include, prior to switching to the single-pass stabilization process for the second frame, triggering a motion stabilization transition process (e.g., transition EIS 360) for transitioning from the dual-pass stabilization process to the single-pass stabilization process. In some cases, the motion stabilization transition process can include two motion stabilization passes (e.g., EIS processing 308 and EIS processing 362). In some examples, a first motion stabilization pass (e.g., EIS processing 308) of the motion stabilization transition process corresponds to the frame preview process and a second motion stabilization pass (e.g., EIS processing 362) of the motion stabilization transition process corresponds to the video record process. In some examples, the second motion stabilization pass can be an EIS3 pass, as previously described.

In some aspects, switching to the single-pass stabilization process for the second frame and/or triggering the motion stabilization transition process can be based on a determination that a low motion confidence (LMC) condition (e.g., 406) is or has been satisfied. The low motion confidence condition can define a low motion threshold (e.g., a maximum amount of motion, a permissible amount of motion, a range of motion, a certain level of motion, an absence of motion, etc.) for triggering a switch from the dual-pass stabilization process to the single-pass stabilization process, a number of frames set to meet the low motion threshold before triggering the switch from the dual-pass stabilization process to the single-pass stabilization process, and/or a period of time set to meet the low motion threshold before triggering the switch from the dual-pass stabilization process to the single-pass stabilization process.

In some aspects, the method 800 can include adjusting, as part of the first motion stabilization pass of the motion stabilization transition process, intermediary frames in the sequence of frames according to a fourth set of parameters (e.g., EIS1 parameters, current motion correction parameters, etc.) for counteracting motion in the intermediary frames. In some examples, the fourth set of parameters can be based on one or more additional motion measurements corresponding to a movement of the image sensor while capturing the intermediary frames. Moreover, in some cases, the intermediary frames can include one or more frames captured by the image sensor after the first frame and before the second frame.

In some aspects, the method 800 can include adjusting, as part of the second motion stabilization pass of the motion stabilization transition process, the intermediary frames according to a set of transition parameters (e.g., EIS3 parameters) for countering motion in the intermediary frames. The set of transition parameters can be based on the one or more additional motion measurements associated with the intermediary frames, a set of motion measurements corresponding to movement of the image sensor while capturing a set of additional frames (e.g., a set of future frames) from the sequence of frames, the first set of parameters associated with the first frame, the second set of parameters associated with the second frame, and/or the fourth set of parameters (e.g., EIS1 parameters, current motion correction parameters, etc.) associated with the intermediary frames. In some cases, the set of additional frames from the sequence of frames can include one or more future frames captured by the image sensor after at least one of the intermediary frames and before the second frame.

In some aspects, the method 800 can include calculating the set of transition parameters. In some examples, calculating the set of transition parameters can include calculating motion stabilization parameters (e.g., EIS2 or EIS3 parameters) for countering motion in the intermediary frames, and adjusting (e.g., aligning) the motion stabilization parameters based on a first difference between the motion stabilization parameters and one or more motion stabilization parameters calculated via the single-pass stabilization process and/or a second difference between the motion stabilization parameters and one or more additional motion stabilization parameters calculated via the dual-pass stabilization process. In some cases, the motion stabilization parameters can be based on the one or more additional motion measurements associated with the intermediary frames and/or the set of motion measurements associated with the set of additional frames.

In some examples, the one or more motion stabilization parameters are calculated based on one or more respective motion measurements representing movement of the image sensor while capturing a first respective frame associated with the one or more motion stabilization parameters. Moreover, in some examples, the one or more additional motion stabilization parameters are calculated based on one or more future motion measurements representing movement of the image sensor while capturing one or more future frames. The one or more future frames can include, for example, frames captured after a second respective frame associated with the one or more additional motion stabilization parameters.

In some cases, adjusting the motion stabilization parameters can include reducing the first difference between the motion stabilization parameters and the one or more motion stabilization parameters calculated via the single-pass stabilization process and/or reducing the second difference between the motion stabilization parameters and the one or more additional motion stabilization parameters calculated via the dual-pass stabilization process.

In some aspects, the method 800 can include adjusting (e.g., stabilizing), as part of a first motion stabilization pass (e.g., EIS processing 308) associated with the dual-pass stabilization process (e.g., dual-pass EIS 340) enabled for the first frame, the first frame according to the second set of parameters, and adjusting (e.g., stabilizing), as part of a second motion stabilization pass (e.g., EIS processing 342) associated with the dual-pass stabilization process, the first frame according to the first set of parameters. In some examples, the first motion stabilization pass can correspond to the frame preview process and the second motion stabilization pass can correspond to the video record process.

The first motion stabilization pass can include an EIS1 pass for a preview path/process (e.g., preview 318) and the dual-pass stabilization process can include a dual-pass EIS (e.g., S2). The adjusting can include stabilizing the first frame using EIS1 as described herein. In some examples, the second motion stabilization pass can correspond to an EIS2 pass for a video record path/process (e.g., 320) of the dual-pass stabilization process.

Moreover, in some examples, adjusting the first frame according to the first set of parameters can include stabilizing the first frame to reduce at least some of the motion in the first frame, adjusting the first frame according to the second set of parameters can include stabilizing the first frame to reduce at least some of the motion in the first frame, and adjusting the second frame according to third set of parameters can include stabilizing the second frame to reduce at least some of the motion in the second frame.

In some cases, the second set of parameters used for the first motion stabilization pass can be calculated at least partly based on one or more future motion measurements corresponding to one or more future frames from the sequence of frames, the first set of parameters used for the second motion stabilization pass can be calculated without using future motion measurements corresponding to future frames from the sequence of frames, and the difference between the first set of parameters and the second set of parameters is above the threshold when an amount of motion between the first frame and the second frame is above a threshold amount of motion.

In some aspects, the method 800 can include, prior to switching to the single-pass stabilization process for the second frame, triggering a motion stabilization transition process (e.g., transition EIS 360). The motion stabilization transition process can align a first motion stabilization trajectory of intermediary frames with a second motion stabilization trajectory associated with the single-pass stabilization process and/or a third motion stabilization trajectory associated with the dual-pass stabilization process. The intermediary frames can include one or more frames captured by the image device after the first frame and before the second frame.

In some aspects, the method 800 can include obtaining the sequence of frames captured by the image sensor. Moreover, in some cases, the movement of the image sensor can include a pitch, a roll, and/or a yaw of the image sensor.

In some aspects, the method 800 can include detecting that a subsequent frame (e.g., a frame captured after the second frame) from the sequence of frames has a higher amount of motion than the second frame and/or one or more intermediary frames captured by the image sensor after the second frame and before the subsequent frame; in response to detecting the higher amount of motion, switching from the single-pass stabilization process to the dual-pass stabilization process (e.g., dual-pass EIS 340); adjusting, as part of a first motion stabilization pass associated with the dual-pass stabilization process, the subsequent frame based on respective parameters for countering motion in the subsequent frame; and adjusting, as part of a second motion stabilization pass associated with the dual-pass stabilization process, the subsequent frame based on a fourth set of parameters for countering motion in the subsequent frame.

In some examples, the respective parameters can be based on respective motion measurements corresponding to a movement of the image sensor while capturing the subsequent frame, and the fourth set of parameters can be based on additional motion measurements corresponding to a movement of the image sensor while capturing the subsequent frame and one or more subsequent frames. In some cases, the one or more subsequent frames can include one or more frames captured after the subsequent frame.

In some examples, the method 800 may be performed by one or more computing devices or apparatuses. In one illustrative example, the method 800 can be performed by the computing system 100 shown in FIG. 1 and/or one or more computing devices with the computing device architecture 900 shown in FIG. 9. In some cases, such a computing device or apparatus may include a processor, microprocessor, microcomputer, or other component of a device that is configured to carry out the steps of the method 800. In some examples, such computing device or apparatus may include one or more sensors configured to collect sensor measurements. For example, the computing device can include a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensor measurements. Such computing device may further include a network interface configured to communicate data.

The method 800 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement various techniques described herein. For example, the computing device architecture 900 can implement at least some portions of the computing system 100 shown in FIG. 1, and perform tracking, localization, mapping, and rendering operations as described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include software, code, firmware, etc., for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
   obtaining one or more motion measurements associated with an image sensor, the one or more motion measurements being based on movement of the image sensor while the image sensor is capturing a sequence of frames;
   calculating a first set of parameters and a second set of parameters for counteracting motion in a first frame from the sequence of frames, wherein the first set of parameters is based on the one or more motion measurements corresponding to the movement of the image sensor while the image sensor is capturing the sequence of frames, and wherein the second set of parameters is based on a first portion of the one or more motion measurements corresponding to movement of the image sensor while capturing the first frame;
   in response to determining that a difference between the first set of parameters and the second set of parameters is above a threshold, switching from a dual-pass stabilization process enabled for the first frame to a single-pass stabilization process for a second frame, the single-pass stabilization process comprising a single motion stabilization pass used for both a frame preview process and a video record process; and
   adjusting, as part of the single motion stabilization pass, the second frame according to a third set of parameters for counteracting motions in the second frame, the third set of parameters being based on a second portion of the one or more motion measurements corresponding to movement of the image sensor while capturing the second frame.

2. The method of claim 1, further comprising:
   prior to switching to the single-pass stabilization process for the second frame, triggering a motion stabilization transition process for transitioning from the dual-pass stabilization process to the single-pass stabilization process, wherein the motion stabilization transition process comprises two motion stabilization passes, a first motion stabilization pass of the motion stabilization transition process corresponding to the frame preview process and a second motion stabilization pass of the motion stabilization transition process corresponding to the video record process.

3. The method of claim 2, wherein at least one of switching to the single-pass stabilization process for the second frame and triggering the motion stabilization transition process is based on a determination that a low motion confidence condition is satisfied, the low motion confidence condition defining at least one of a low motion threshold for triggering the switch from the dual-pass stabilization process to the single-pass stabilization process, a number of frames set to meet the low motion threshold before triggering the switch from the dual-pass stabilization process to the single-pass stabilization process, and a period of time set to meet the low motion threshold before triggering the switch from the dual-pass stabilization process to the single-pass stabilization process.

4. The method of claim 2, further comprising:
adjusting, as part of the first motion stabilization pass of the motion stabilization transition process, intermediary frames in the sequence of frames according to a fourth set of parameters for counteracting motion in the intermediary frames, the fourth set of parameters being based on one or more additional motion measurements corresponding to movement of the image sensor while capturing the intermediary frames, the intermediary frames being captured by the image sensor after the first frame and before the second frame; and
adjusting, as part of the second motion stabilization pass of the motion stabilization transition process, the intermediary frames according to a set of transition parameters for countering motion in the intermediary frames, the set of transition parameters being based on at least one of the one or more additional motion measurements associated with the intermediary frames, a set of motion measurements corresponding to movement of the image sensor while capturing a set of additional frames from the sequence of frames, the first set of parameters associated with the first frame, the second set of parameters associated with the second frame, and the fourth set of parameters associated with the intermediary frames.

5. The method of claim 4, wherein the set of additional frames from the sequence of frames comprises one or more future frames captured by the image sensor after at least one of the intermediary frames and before the second frame, the method further comprising calculating the set of transition parameters.

6. The method of claim 5, wherein calculating the set of transition parameters comprises:
calculating motion stabilization parameters for countering motion in the intermediary frames, the motion stabilization parameters being based on at least one of the one or more additional motion measurements associated with the intermediary frames and the set of motion measurements associated with the set of additional frames; and
adjusting the motion stabilization parameters based on at least one of a first difference between the motion stabilization parameters and one or more motion stabilization parameters calculated via the single-pass stabilization process and a second difference between the motion stabilization parameters and one or more additional motion stabilization parameters calculated via the dual-pass stabilization process.

7. The method of claim 6, wherein the one or more motion stabilization parameters are calculated based on respective motion measurements representing movement of the image sensor while capturing a first respective frame associated with the one or more motion stabilization parameters, wherein the one or more additional motion stabilization parameters are calculated based on future motion measurements representing movement of the image sensor while capturing one or more future frames, the one or more future frames comprising frames captured after a second respective frame associated with the one or more additional motion stabilization parameters.

8. The method of claim 6, wherein adjusting the motion stabilization parameters comprises reducing at least one of the first difference between the motion stabilization parameters and the one or more motion stabilization parameters calculated via the single-pass stabilization process and reducing the second difference between the motion stabilization parameters and the one or more additional motion stabilization parameters calculated via the dual-pass stabilization process.

9. The method of claim 1, further comprising:
prior to switching to the single-pass stabilization process for the second frame, triggering a motion stabilization transition process, the motion stabilization transition process aligning a first motion stabilization trajectory of intermediary frames with at least one of a second motion stabilization trajectory associated with the single-pass stabilization process and a third motion stabilization trajectory associated with the dual-pass stabilization process, wherein the intermediary frames are captured by the image sensor after the first frame and before the second frame.

10. The method of claim 1, wherein the movement of the image sensor comprises at least one of a pitch, a roll, and a yaw of the image sensor.

11. The method of claim 1, further comprising:
detecting that a subsequent frame from the sequence of frames has a higher amount of motion than at least one of the second frame and one or more intermediary frames captured by the image sensor after the second frame and before the subsequent frame;
in response to detecting the higher amount of motion, switching from the single-pass stabilization process to the dual-pass stabilization process;
adjusting, as part of a first motion stabilization pass associated with the dual-pass stabilization process, the subsequent frame based on respective parameters for countering motions in the subsequent frame, the respective parameters being based on one or more respective motion measurements corresponding to movement of the image sensor while capturing the subsequent frame; and
adjusting, as part of a second motion stabilization pass associated with the dual-pass stabilization process, the subsequent frame based on a fourth set of parameters for countering motion in the subsequent frame, the fourth set of parameters being based on one or more additional motion measurements corresponding to movement of the image sensor while capturing the subsequent frame and one or more subsequent frames, the one or more subsequent frames being captured after the subsequent frame.

12. The method of claim 1, further comprising:
adjusting, as part of a first motion stabilization pass associated with the dual-pass stabilization process enabled for the first frame, the first frame according to the second set of parameters, wherein the first motion stabilization pass corresponds to the frame preview process; and
adjusting, as part of a second motion stabilization pass associated with the dual-pass stabilization process, the first frame according to the first set of parameters, wherein the second motion stabilization pass corresponds to the video record process.

13. The method of claim 12, wherein adjusting the first frame according to the first set of parameters comprises stabilizing the first frame to reduce at least some of the motion in the first frame, wherein adjusting the first frame according to the second set of parameters comprises stabilizing the first frame to reduce at least some of the motion in the first frame, and wherein adjusting the second frame according to third set of parameters comprises stabilizing the second frame to reduce at least some of the motion in the second frame.

14. The method of claim 12, wherein the second set of parameters used for the first motion stabilization pass is calculated at least partly based on one or more future motion measurements corresponding to one or more future frames from the sequence of frames, wherein the first set of parameters used for the second motion stabilization pass is calculated without using future motion measurements corresponding to future frames from the sequence of frames, and wherein the difference between the first set of parameters and the second set of parameters is above the threshold when an amount of motion between the first frame and the second frame is above a threshold amount of motion.

15. An apparatus comprising:
memory; and
one or more processors coupled to the memory, the one or more processors being configured to:
obtain one or more motion measurements associated with an image sensor, the one or more motion measurements being based on movement of the image sensor while the image sensor is capturing a sequence of frames;
calculate a first set of parameters and a second set of parameters for counteracting motion in a first frame from the sequence of frames, wherein the first set of parameters is based on the one or more motion measurements corresponding to the movement of the image sensor while the image sensor is capturing the sequence of frames, and wherein the second set of parameters is based on a first portion of the one or more motion measurements corresponding to movement of the image sensor while capturing the first frame;
in response to determining that a difference between the first set of parameters and the second set of parameters is above a threshold, switch from a dual-pass stabilization process enabled for the first frame to a single-pass stabilization process for a second frame, the single-pass stabilization process comprising a single motion stabilization pass used for both a frame preview process and a video record process; and
adjust, as part of the single motion stabilization pass, the second frame according to a third set of parameters for counteracting motions in the second frame, the third set of parameters being based on a second portion of the one or more motion measurements corresponding to movement of the image sensor while capturing the second frame.

16. The apparatus of claim 15, the one or more processors being configured to:
trigger, prior to switching to the single-pass stabilization process for the second frame, a motion stabilization transition process for transitioning from the dual-pass stabilization process to the single-pass stabilization process, wherein the motion stabilization transition process comprises two motion stabilization passes, a first motion stabilization pass of the motion stabilization transition process corresponding to the frame preview process and a second motion stabilization pass of the motion stabilization transition process corresponding to the video record process.

17. The apparatus of claim 16, wherein at least one of switching to the single-pass stabilization process for the second frame and triggering the motion stabilization transition process is based on a determination that a low motion confidence condition is satisfied, the low motion confidence condition defining at least one of a low motion threshold for triggering the switch from the dual-pass stabilization process to the single-pass stabilization process, a number of frames set to meet the low motion threshold before triggering the switch from the dual-pass stabilization process to the single-pass stabilization process, and a period of time set to meet the low motion threshold before triggering the switch from the dual-pass stabilization process to the single-pass stabilization process.

18. The apparatus of claim 16, the one or more processors being configured to:
adjust, as part of the first motion stabilization pass of the motion stabilization transition process, intermediary frames in the sequence of frames according to a fourth set of parameters for counteracting motion in the intermediary frames, the fourth set of parameters being based on one or more additional motion measurements corresponding to movement of the image sensor while capturing the intermediary frames, the intermediary frames being captured by the image sensor after the first frame and before the second frame; and
adjust, as part of the second motion stabilization pass of the motion stabilization transition process, the intermediary frames according to a set of transition parameters for countering motion in the intermediary frames, the set of transition parameters being based on at least one of the one or more additional motion measurements associated with the intermediary frames, a set of motion measurements corresponding to movement of the image sensor while capturing a set of additional frames from the sequence of frames, the first set of parameters associated with the first frame, the second set of parameters associated with the second frame, and the fourth set of parameters associated with the intermediary frames.

19. The apparatus of claim 18, wherein the set of additional frames from the sequence of frames comprises one or more future frames captured by the image sensor after at least one of the intermediary frames and before the second frame, the one or more processors being configured to calculate the set of transition parameters.

20. The apparatus of claim 19, wherein calculating the set of transition parameters comprises:
calculating motion stabilization parameters for countering motion in the intermediary frames, the motion stabilization parameters being based on at least one of the one or more additional motion measurements associated with the intermediary frames and the set of motion measurements associated with the set of additional frames; and adjusting the motion stabilization parameters based on at least one of a first difference between the motion stabilization parameters and one or more motion stabilization parameters calculated via the single-pass stabilization process and a second difference between the motion stabilization parameters and one or more additional motion stabilization parameters calculated via the dual-pass stabilization process.

21. The apparatus of claim 20, wherein the one or more motion stabilization parameters are calculated based on respective motion measurements representing movement of the image sensor while capturing a first respective frame associated with the one or more motion stabilization parameters, wherein the one or more additional motion stabilization parameters are calculated based on future motion measurements representing movement of the image sensor while capturing one or more future frames, the one or more future frames comprising frames captured after a second respective frame associated with the one or more additional motion stabilization parameters.

22. The apparatus of claim 20, wherein adjusting the motion stabilization parameters comprises reducing at least one of the first difference between the motion stabilization parameters and the one or more motion stabilization parameters calculated via the single-pass stabilization process and reducing the second difference between the motion stabilization parameters and the one or more additional motion stabilization parameters calculated via the dual-pass stabilization process.

23. The apparatus of claim 15, the one or more processors being configured to:

trigger, prior to switching to the single-pass stabilization process for the second frame, a motion stabilization transition process, the motion stabilization transition process aligning a first motion stabilization trajectory of intermediary frames with at least one of a second motion stabilization trajectory associated with the single-pass stabilization process and a third motion stabilization trajectory associated with the dual-pass stabilization process, wherein the intermediary frames are captured by the image sensor after the first frame and before the second frame.

24. The apparatus of claim 15, wherein the movement of the image sensor comprises at least one of a pitch, a roll, and a yaw of the image sensor.

25. The apparatus of claim 15, the one or more processors being configured to:

detect that a subsequent frame from the sequence of frames has a higher amount of motion than at least one of the second frame and one or more intermediary frames captured by the image sensor after the second frame and before the subsequent frame;

in response to detecting the higher amount of motion, switch from the single-pass stabilization process to the dual-pass stabilization process;

adjust, as part of a first motion stabilization pass associated with the dual-pass stabilization process, the subsequent frame based on respective parameters for countering motions in the subsequent frame, the respective parameters being based on one or more respective motion measurements corresponding to movement of the image sensor while capturing the subsequent frame; and adjust, as part of a second motion stabilization pass associated with the dual-pass stabilization process, the subsequent frame based on a fourth set of parameters for countering motion in the subsequent frame, the fourth set of parameters being based on one or more additional motion measurements corresponding to movement of the image sensor while capturing the subsequent frame and one or more subsequent frames, the one or more subsequent frames being captured after the subsequent frame.

26. The apparatus of claim 15, the one or more processors being configured to:

adjust, as part of a first motion stabilization pass associated with the dual-pass stabilization process enabled for the first frame, the first frame according to the second set of parameters, wherein the first motion stabilization pass corresponds to the frame preview process; and adjust, as part of a second motion stabilization pass associated with the dual-pass stabilization process, the first frame according to the first set of parameters, wherein the second motion stabilization pass corresponds to the video record process.

27. The apparatus of claim 26, wherein adjusting the first frame according to the first set of parameters comprises stabilizing the first frame to reduce at least some of the motion in the first frame, wherein adjusting the first frame according to the second set of parameters comprises stabilizing the first frame to reduce at least some of the motion in the first frame, and wherein adjusting the second frame according to third set of parameters comprises stabilizing the second frame to reduce at least some of the motion in the second frame.

28. The apparatus of claim 26, wherein the second set of parameters used for the first motion stabilization pass is calculated at least partly based on one or more future motion measurements corresponding to one or more future frames from the sequence of frames, wherein the first set of parameters used for the second motion stabilization pass is calculated without using future motion measurements corresponding to future frames from the sequence of frames, and wherein the difference between the first set of parameters and the second set of parameters is above the threshold when an amount of motion between the first frame and the second frame is above a threshold amount of motion.

29. The apparatus of claim 15, wherein the apparatus is a mobile device.

30. A non-transitory computer-readable storage medium comprising:

instructions stored thereon which, when executed by one or more processors, cause the one or more processors to:

obtain one or more motion measurements associated with an image sensor, the one or more motion measurements being based on movement of the image sensor while the image sensor is capturing a sequence of frames;

calculate a first set of parameters and a second set of parameters for counteracting motion in a first frame from the sequence of frames, wherein the first set of parameters is based on the one or more motion measurements corresponding to the movement of the image sensor while the image sensor is capturing the sequence of frames, and wherein the second set of parameters is based on a first portion of the one or more motion measurements corresponding to movement of the image sensor while capturing the first frame;

in response to determining that a difference between the first set of parameters and the second set of parameters is above a threshold, switch from a dual-pass stabilization process enabled for the first frame to a single-pass stabilization process for a second frame, the single-pass stabilization process comprising a single motion stabilization pass used for both a frame preview process and a video record process; and adjust, as part of the single motion stabilization pass, the second frame according to a third set of parameters for counteracting motions in the second frame, the third set of parameters being based on a second portion of the one or more motion measurements corresponding to movement of the image sensor while capturing the second frame.

* * * * *